US012615609B2

(12) United States Patent
Zhang et al.

(10) Patent No.: US 12,615,609 B2
(45) Date of Patent: Apr. 28, 2026

(54) NETWORK SLICING TRAFFIC DESCRIPTOR ENCODING

(71) Applicant: QUALCOMM INCORPORATED, San Diego, CA (US)

(72) Inventors: Nan Zhang, Beijing (CN); Chaofeng Hui, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 17/999,602

(22) PCT Filed: May 25, 2020

(86) PCT No.: PCT/CN2020/092102
§ 371 (c)(1),
(2) Date: Nov. 22, 2022

(87) PCT Pub. No.: WO2021/237408
PCT Pub. Date: Dec. 2, 2021

(65) Prior Publication Data
US 2023/0209491 A1 Jun. 29, 2023

(51) Int. Cl.
*H04W 60/04* (2009.01)
*H04L 41/5041* (2022.01)
*H04W 28/08* (2023.01)

(52) U.S. Cl.
CPC ......... *H04W 60/04* (2013.01); *H04L 41/5045* (2013.01); *H04W 28/0925* (2020.05)

(58) Field of Classification Search
CPC ... H04W 60/04; H04W 28/0925; H04W 4/50; H04W 48/16; H04W 48/18; H04L 41/5045
See application file for complete search history.

(56) References Cited

U.S. PATENT DOCUMENTS 10,602,422 B1 * 3/2020 Jagannatha ........... H04L 45/306
11,405,789 B1 * 8/2022 Wei ......................... H04W 4/50
(Continued)

FOREIGN PATENT DOCUMENTS

CN 107959582 A 4/2018
CN 108323245 A 7/2018
(Continued)

OTHER PUBLICATIONS

3rd Generation Partnership Project Technical Specification Group Core Network and Terminals, UE Equipment (UE) Policies for 5G System (5GS) Stage 3 (Release 15) No. 3GPP TS 24.526 2.0.0, vol. Sep. 30, 2018 (Sep. 30, 2018), pp. 1-37.
(Continued)

*Primary Examiner* — Mazda Sabouri
(74) *Attorney, Agent, or Firm* — Holland & Hart LLP

(57) ABSTRACT

Methods, systems, and devices for wireless communications are described. A user equipment (UE) may receive a traffic descriptor that includes a character string corresponding to an application of the UE. In some cases, the character string may be encoded to represent a sequence of characters in the character string to index or match applications to different network slices for communications for the UE. For example, the character string may be encoded using American Standard Code for Information Interchange (ASCII) encoding. After receiving and decoding the encoded traffic descriptor, the UE may identify a matching network slice for the application corresponding to the character string of the traffic descriptor. Subsequently, the UE may attempt to establish a connection with the matching network slice for communications for the application and may communicate with the matching network slice for the application based on a successful establishment of the connection.

25 Claims, 18 Drawing Sheets

(56)        References Cited

U.S. PATENT DOCUMENTS

| | | | | |
|---|---|---|---|---|
| 2019/0082360 A1* | 3/2019 | Henry | .............. | H04W 36/0016 |
| 2019/0289439 A1* | 9/2019 | Sangameshwara | ... | H04W 28/04 |
| 2020/0053622 A1 | 2/2020 | Huang-Fu et al. | | |
| 2020/0169921 A1* | 5/2020 | Zhu | ......................... | H04W 8/02 |
| 2020/0389531 A1* | 12/2020 | Lee | ......................... | H04L 67/01 |
| 2022/0014973 A1* | 1/2022 | Perras | ..................... | H04W 4/46 |
| 2022/0166776 A1* | 5/2022 | Lee | ....................... | H04W 48/16 |
| 2023/0019089 A1* | 1/2023 | Li | ....................... | H04W 12/041 |

FOREIGN PATENT DOCUMENTS

| | | |
|---|---|---|
| WO | WO-2017140644 A1 | 8/2017 |
| WO | WO-2020064125 A1 | 4/2020 |

OTHER PUBLICATIONS

International Search Report and Written Opinion—PCT/CN2020/092102—ISA/EPO—Feb. 3, 2021.

"3rd Generation Partnership Project, Technical Specification Group Core Network and Terminals, User Equipment (UE) policies for 5G System (5GS), Stage 3 (Release 16)", 3GPP TS 24.526, Mobile Competence Centre, 650, Route Des Lucioles, F-06921 Sophia-Antipolis Cedex, France, vol. CT WG1, No. 3GPP TS 24.526, V16.3.0, Mar. 27, 2020, pp. 1-51, XP051861109, paragraphs [4.2.1], [4.2.2.2], paragraphs [4.4.2.1], [05.2].

"3rd Generation Partnership Project; Technical Specification Group Services and System Aspects; Policy and Charging Control Framework for the 5G System (5GS); Stage 2 (Release 16)", 3GPP TS 23.503 V16.4.1, Apr. 30, 2020, pp. 1-110, pp. 29-31, 97-98.

Huawei, et al., "Discussion on Application Descriptor", 3GPP TSG-WG SA2 Meeting #137E e-meeting, S2-2002124, 3rd Generation Partnership Project (3GPP), Mobile Competence Centre, 650, Route Des Lucioles, F-06921 Sophia-Antipolis Cedex, France, vol. SA WG2, No. e-meeting, Feb. 24, 2020-Feb. 27, 2024, Feb. 18, 2020, pp. 1-5, XP052456830, Paragraphs [002.] , [003.].

Huawei, et al., "Discussion on Enhanced Application Level Descriptor", 3GPP TSG-WG SA2 Meeting #138E e-meeting, S2-2002943, 3rd Generation Partnership Project (3GPP), Mobile Competence Centre, 650, Route Des Lucioles, F-06921 Sophia-Antipolis Cedex, France, vol. SA WG2, No. E-meeting, Apr. 20, 2020-Apr. 23, 2020, Apr. 10, 2020, XP052458989, paragraphs [002.], [003.].

Huawei, et al., "Enhanced Application Level Descriptor in UE Related Rules", 3GPP TSG-WG SA2 Meeting #138E e-meeting, S2-2002944, 3rd Generation Partnership Project, Mobile Competence Centre, 650, Route Des Lucioles, F-06921 Sophia-Antipolis Cedex, France, vol. SA WG2, No. e-meeting, Apr. 20, 2020-Apr. 23, 2020, Apr. 10, 2020, 5 Pages, XP052458990, paragraph [6.6.2.1].

Supplementary European Search Report—EP20937696—Search Authority—Munich—Feb. 8, 2024.

* cited by examiner

510

515

520

505

500

910

915

920

905

900

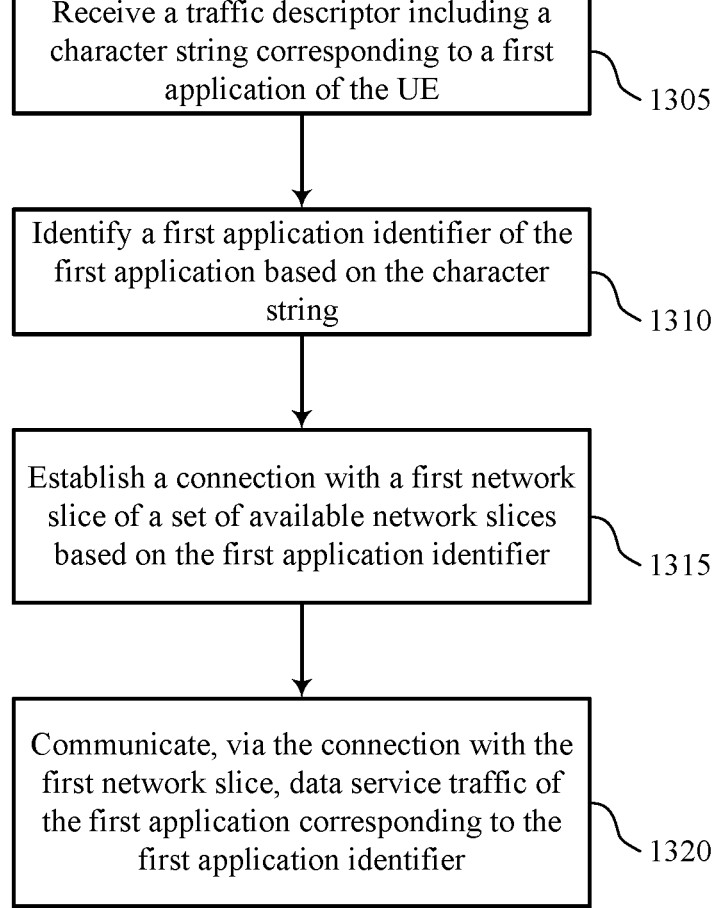

Receive a traffic descriptor including a character string corresponding to a first application of the UE ⌐ 1305

Identify a first application identifier of the first application based on the character string ⌐ 1310

Establish a connection with a first network slice of a set of available network slices based on the first application identifier ⌐ 1315

Communicate, via the connection with the first network slice, data service traffic of the first application corresponding to the first application identifier ⌐ 1320

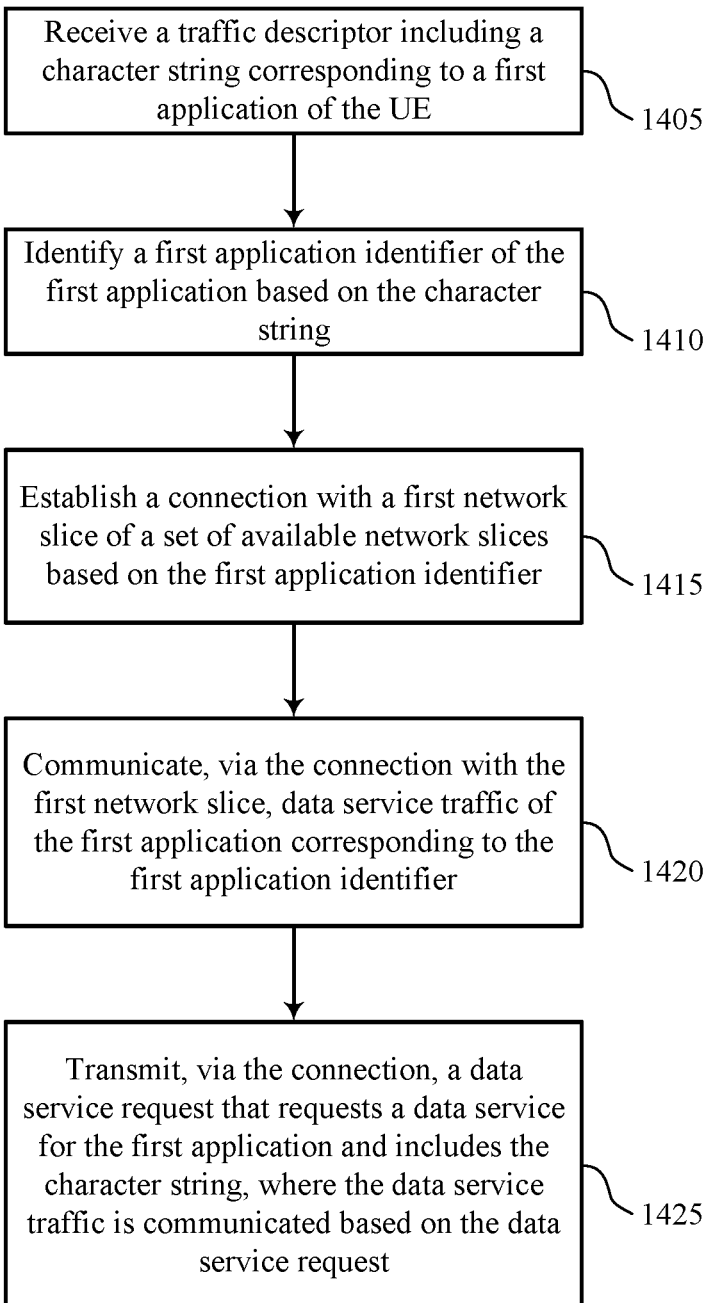

Receive a traffic descriptor including a character string corresponding to a first application of the UE

1405

Identify a first application identifier of the first application based on the character string

1410

Establish a connection with a first network slice of a set of available network slices based on the first application identifier

1415

Communicate, via the connection with the first network slice, data service traffic of the first application corresponding to the first application identifier

1420

Transmit, via the connection, a data service request that requests a data service for the first application and includes the character string, where the data service traffic is communicated based on the data service request

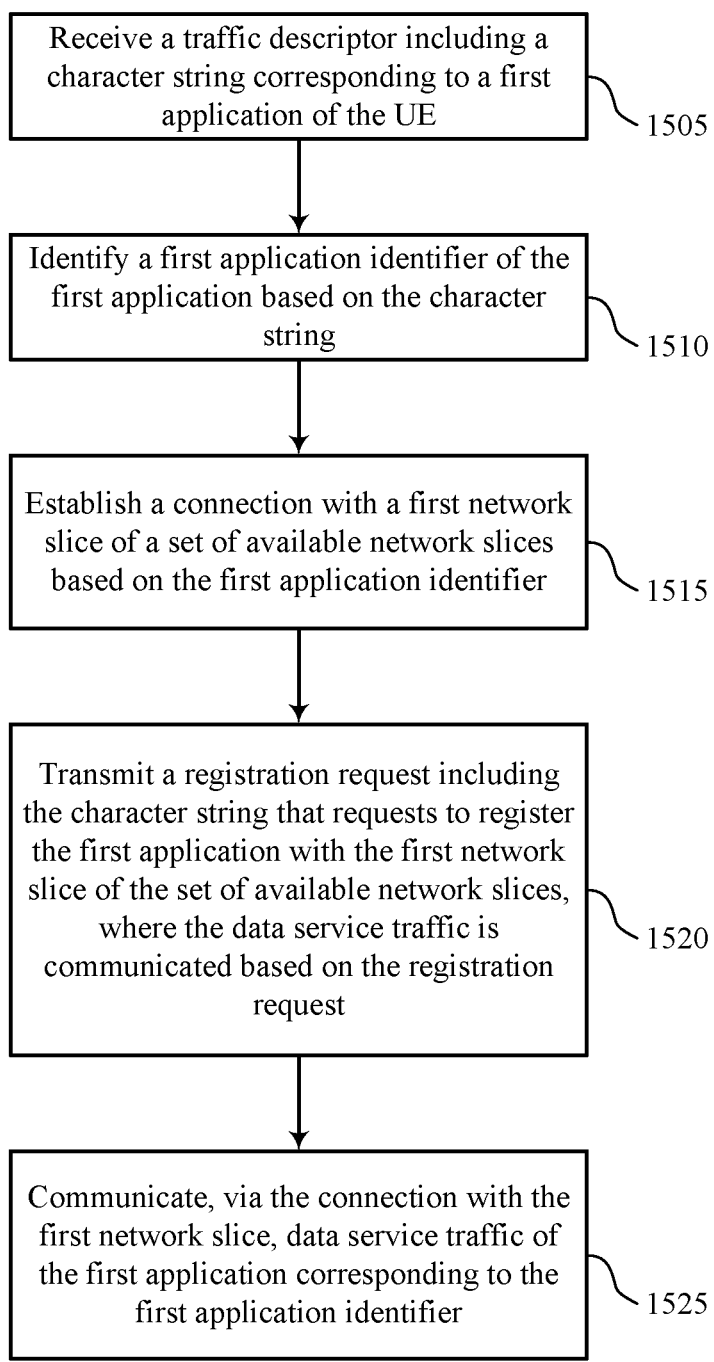

Receive a traffic descriptor including a character string corresponding to a first application of the UE

~1505

Identify a first application identifier of the first application based on the character string

~1510

Establish a connection with a first network slice of a set of available network slices based on the first application identifier

~1515

Transmit a registration request including the character string that requests to register the first application with the first network slice of the set of available network slices, where the data service traffic is communicated based on the registration request

~1520

Communicate, via the connection with the first network slice, data service traffic of the first application corresponding to the first application identifier

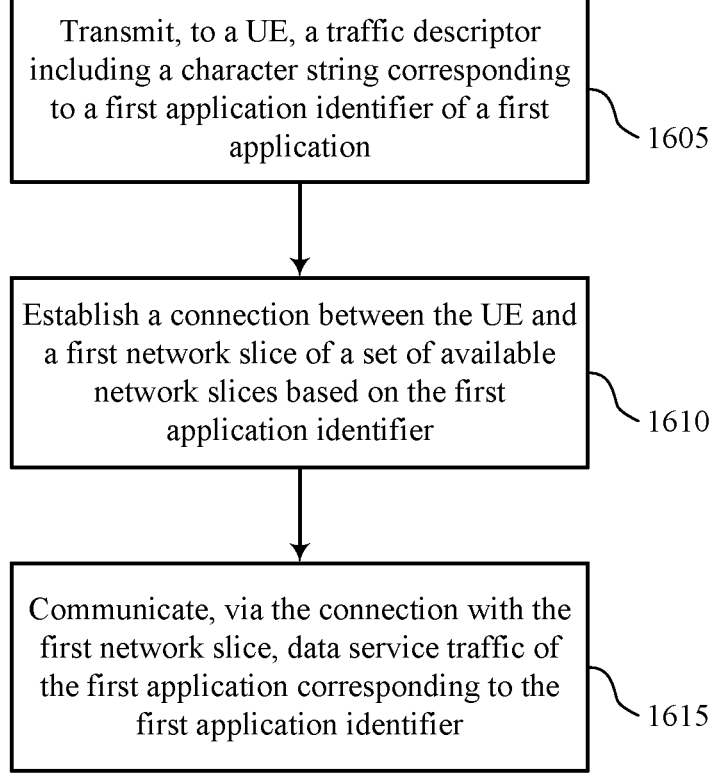

Transmit, to a UE, a traffic descriptor including a character string corresponding to a first application identifier of a first application

1605

Establish a connection between the UE and a first network slice of a set of available network slices based on the first application identifier

1610

Communicate, via the connection with the first network slice, data service traffic of the first application corresponding to the first application identifier

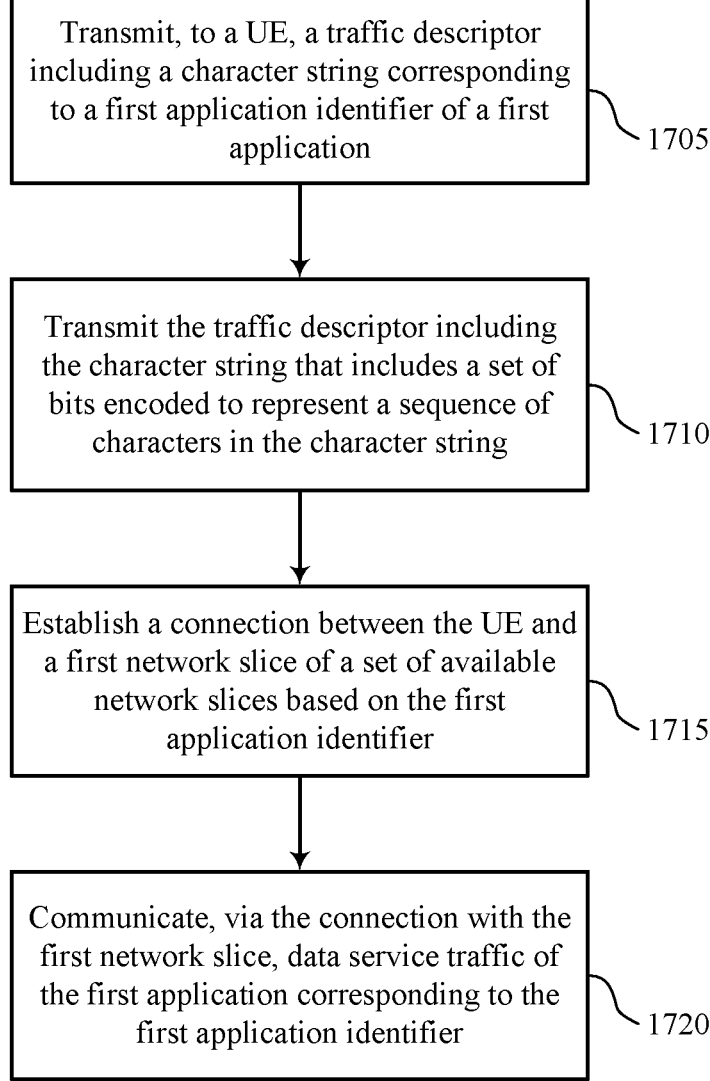

Transmit, to a UE, a traffic descriptor including a character string corresponding to a first application identifier of a first application

1705

Transmit the traffic descriptor including the character string that includes a set of bits encoded to represent a sequence of characters in the character string

1710

Establish a connection between the UE and a first network slice of a set of available network slices based on the first application identifier

1715

Communicate, via the connection with the first network slice, data service traffic of the first application corresponding to the first application identifier

NETWORK SLICING TRAFFIC DESCRIPTOR ENCODING

CROSS REFERENCE

The present Application is a 371 national stage filing of International PCT Application No. PCT/CN2020/092102 by ZHANG et al. entitled "NETWORK SLICING TRAFFIC DESCRIPTOR ENCODING," filed May 25, 2020, which is assigned to the assignee hereof, and which is expressly incorporated by reference in its entirety herein.

FIELD OF TECHNOLOGY

The following relates generally to wireless communications and more specifically to network slicing traffic descriptor encoding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications system, a UE may access a network slice for communicating with a base station. Improved techniques for managing communications between a base station and a UE via a network slice may be desirable.

SUMMARY

The described techniques relate to improved methods, systems, devices, and apparatuses that support network slicing traffic descriptor encoding. Generally, the described techniques provide for a user equipment (UE) to receive a traffic descriptor that includes a character string corresponding to an application of the UE (e.g., an operating system application identifier field). In some cases, a base station (e.g., a network entity) may encode the character string to represent a sequence of characters in the character string to index or match applications to different network slices for communications for the UE. For example, the base station may encode the character string using American Standard Code for Information Interchange (ASCII) encoding to use character strings to index the applications. After receiving and decoding the encoded traffic descriptor, the UE may identify a matching network slice for the application corresponding to the character string of the traffic descriptor.

Subsequently, the UE may attempt to establish a connection with the matching network slice for communications for the application and may communicate with the matching network slice for the application based on a successful establishment of the connection. For example, when establishing the connection, the UE may transmit a registration request that includes the character string to request to register the application with the matching network slice. Additionally, once the connection is established, the UE may transmit a data service request with the character string using the connection to request a data service for the application.

A method of wireless communications by a UE is described. The method may include receiving a traffic descriptor including a character string corresponding to a first application of the UE, identifying a first application identifier of the first application based on the character string, establishing a connection with a first network slice of a set of available network slices based on the first application identifier, and communicating, via the connection with the first network slice, data service traffic of the first application corresponding to the first application identifier.

An apparatus for wireless communications by a UE is described. The apparatus may include a processor, memory coupled with the processor, and instructions stored in the memory. The instructions may be executable by the processor to cause the apparatus to receive a traffic descriptor including a character string corresponding to a first application of the UE, identify a first application identifier of the first application based on the character string, establish a connection with a first network slice of a set of available network slices based on the first application identifier, and communicate, via the connection with the first network slice, data service traffic of the first application corresponding to the first application identifier.

Another apparatus for wireless communications by a UE is described. The apparatus may include means for receiving a traffic descriptor including a character string corresponding to a first application of the UE, identifying a first application identifier of the first application based on the character string, establishing a connection with a first network slice of a set of available network slices based on the first application identifier, and communicating, via the connection with the first network slice, data service traffic of the first application corresponding to the first application identifier.

A non-transitory computer-readable medium storing code for wireless communications by a UE is described. The code may include instructions executable by a processor to receive a traffic descriptor including a character string corresponding to a first application of the UE, identify a first application identifier of the first application based on the character string, establish a connection with a first network slice of a set of available network slices based on the first application identifier, and communicate, via the connection with the first network slice, data service traffic of the first application corresponding to the first application identifier.

Some examples of the method, apparatuses, and non-transitory computer-readable medium described herein may further include operations, features, means, or instructions for transmitting, via the connection, a data service request that requests a data service for the first application and includes the character string, where the data service traffic may be communicated based on the data service request.

In some examples of the method, apparatuses, and non-transitory computer-readable medium described herein, establishing the connection with the first network slice may include operations, features, means, or instructions for transmitting a registration request including the character string that requests to register the first application with the first network slice of the set of available network slices, where the data service traffic may be communicated based on the registration request.

Some examples of the method, apparatuses, and non-transitory computer-readable medium described herein may further include operations, features, means, or instructions for receiving control signaling that indicates a set of character strings for a set of applications listed in an application table.

In some examples of the method, apparatuses, and non-transitory computer-readable medium described herein, receiving the traffic descriptor may include operations, features, means, or instructions for receiving the traffic descriptor including the character string that includes a set of bits encoded to represent a sequence of characters in the character string.

Some examples of the method, apparatuses, and non-transitory computer-readable medium described herein may further include operations, features, means, or instructions for decoding the set of bits to obtain the character string.

In some examples of the method, apparatuses, and non-transitory computer-readable medium described herein, receiving the traffic descriptor may include operations, features, means, or instructions for receiving the traffic descriptor including the character string that includes a set of bits encoded using ASCII encoding to represent a sequence of characters in the character string.

In some examples of the method, apparatuses, and non-transitory computer-readable medium described herein, receiving the traffic descriptor may include operations, features, means, or instructions for receiving the traffic descriptor that may be a network slice selection policy (NSSP) traffic descriptor.

In some examples of the method, apparatuses, and non-transitory computer-readable medium described herein, receiving the traffic descriptor may include operations, features, means, or instructions for receiving the traffic descriptor including the character string that may be a field having an octet length.

In some examples of the method, apparatuses, and non-transitory computer-readable medium described herein, identifying the first application identifier may include operations, features, means, or instructions for indexing an application table to identify the first application identifier based on the character string.

A method of wireless communications by a base station is described. The method may include transmitting, to a UE, a traffic descriptor including a character string corresponding to a first application identifier of a first application, establishing a connection between the UE and a first network slice of a set of available network slices based on the first application identifier, and communicating, via the connection with the first network slice, data service traffic of the first application corresponding to the first application identifier.

An apparatus for wireless communications by a base station is described. The apparatus may include a processor, memory coupled with the processor, and instructions stored in the memory. The instructions may be executable by the processor to cause the apparatus to transmit, to a UE, a traffic descriptor including a character string corresponding to a first application identifier of a first application, establish a connection between the UE and a first network slice of a set of available network slices based on the first application identifier, and communicate, via the connection with the first network slice, data service traffic of the first application corresponding to the first application identifier.

Another apparatus for wireless communications by a base station is described. The apparatus may include means for transmitting, to a UE, a traffic descriptor including a character string corresponding to a first application identifier of a first application, establishing a connection between the UE and a first network slice of a set of available network slices based on the first application identifier, and communicating, via the connection with the first network slice, data service traffic of the first application corresponding to the first application identifier.

A non-transitory computer-readable medium storing code for wireless communications by a base station is described. The code may include instructions executable by a processor to transmit, to a UE, a traffic descriptor including a character string corresponding to a first application identifier of a first application, establish a connection between the UE and a first network slice of a set of available network slices based on the first application identifier, and communicate, via the connection with the first network slice, data service traffic of the first application corresponding to the first application identifier.

Some examples of the method, apparatuses, and non-transitory computer-readable medium described herein may further include operations, features, means, or instructions for receiving, via the connection, a data service request that requests a data service for the first application and includes the character string, where the data service traffic may be communicated based on the data service request.

In some examples of the method, apparatuses, and non-transitory computer-readable medium described herein, establishing the connection with the first network slice may include operations, features, means, or instructions for receiving a registration request including the character string that requests to register the first application with the first network slice of the set of available network slices, where the data service traffic may be communicated based on the registration request.

Some examples of the method, apparatuses, and non-transitory computer-readable medium described herein may further include operations, features, means, or instructions for transmitting control signaling that indicates a set of character strings for a set of applications listed in an application table.

In some examples of the method, apparatuses, and non-transitory computer-readable medium described herein, transmitting the traffic descriptor may include operations, features, means, or instructions for transmitting the traffic descriptor including the character string that includes a set of bits encoded to represent a sequence of characters in the character string.

Some examples of the method, apparatuses, and non-transitory computer-readable medium described herein may further include operations, features, means, or instructions for encoding the set of bits to obtain the character string.

In some examples of the method, apparatuses, and non-transitory computer-readable medium described herein, transmitting the traffic descriptor may include operations, features, means, or instructions for transmitting the traffic descriptor including the character string that includes a set of bits encoded using ASCII encoding to represent a sequence of characters in the character string.

In some examples of the method, apparatuses, and non-transitory computer-readable medium described herein, transmitting the traffic descriptor may include operations, features, means, or instructions for transmitting the traffic descriptor that may be an NSSP traffic descriptor.

In some examples of the method, apparatuses, and non-transitory computer-readable medium described herein, transmitting the traffic descriptor may include operations, features, means, or instructions for transmitting the traffic descriptor including the character string that may be a field having an octet length.

In some examples of the method, apparatuses, and non-transitory computer-readable medium described herein, the first application identifier may be an operating system application identifier.

BRIEF DESCRIPTION OF THE DRAWINGS

FIGS. 13 through 18 show flowcharts illustrating methods that support network slicing traffic descriptor encoding in accordance with aspects of the present disclosure.

DETAILED DESCRIPTION

Figure 1:
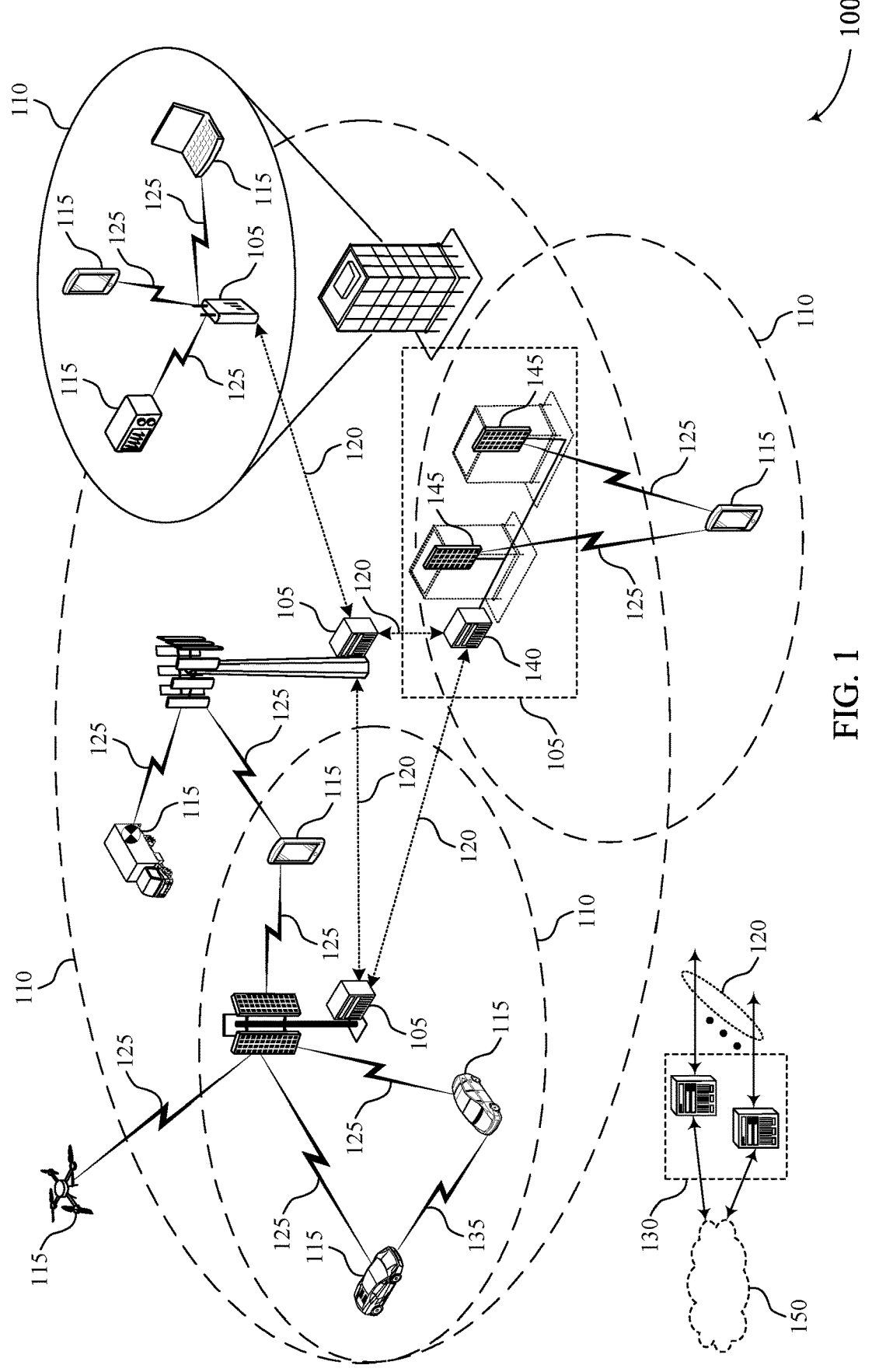
FIG. 1 illustrates an example of a system for wireless communications that supports network slicing traffic descriptor encoding in accordance with aspects of the present disclosure.

Some wireless communications system may support the use of network slices to support additional features and network function optimizations. A network slice may be a logical end-to-end network that can be dynamically created. For example, a user equipment (UE) may establish a protocol data unit (PDU) session for a logical data network, where the logical data network may be referred to as a network slice. In some cases, a UE may select a network slice based on an application or subscription service. For example, a UE may have an application that is an internet protocol (IP) multimedia systems (IMS) voice application, and the UE may select a network slice that is configured to support this mobile broadband application. A UE may, additionally or alternatively, have an application that is configured as an Internet of Everything (IoT) application; for example, the IoT application may configure the UE to operate as an IoT gateway device that compiles and transmits data to a remote server, periodically. As such, the UE may select a network slice that is configured to support massive IoT data traffic. By having different network slices serving different applications, subscriptions, etc., the UE may improve its resource utilization in a network, while also satisfying performance requirements of individual applications of the UE.

The network slices may be served by different network functions (e.g., access and mobility management function (AMF), session management function (SMF), etc.). The network may, in some cases, provide network slice selection assistance information (NSSAI) or a set of allowed NSSAIs (S-NSSAI) to the UE. The NSSAI may include information indicating allowed or supported network slices for the UE to use, among other information. A data network may be associated with an S-NSSAI. In some cases, a network operator may provide to a UE a network slice selection policy (NSSP). The NSSP may include one or more NSSP rules, each one associating an application with a certain S-NSSAI. In some cases, a default rule may match all applications to a S-NSSAI. In some cases, a UE application associated with an S-NSSAI may request data transmission.

Additionally, the NSSP may include a traffic descriptor that includes a character string corresponding to an application of the UE (e.g., an operating system application identifier field). The NSSP may enable the UE to index an application to a particular network slicing instance. The UE may use this traffic descriptor to search and match traffic to an application in running in an operating system for the UE. A public land mobile network (PLMN) may provide the UE with a list of traffic descriptors associated with each application of the UE, where each traffic descriptor indicates a network slice (e.g., from a set of available network slices) for providing data service to the corresponding application. Each traffic descriptor may include an application identifier (e.g., an operating system application identifier field) indicating the corresponding application. Thus, when an application requests a new data service, the UE may match the application identifier of the requesting application to an application identifier within a traffic descriptor. The UE may then transmit a data service request associated with the network slice indicated by the traffic descriptor. However, this traffic descriptor may not be encoded.

As described herein, a network entity (e.g., a base station) may encode a character string (e.g., operating system application identifier field) in the traffic descriptor using American Standard Code for Information Interchange (ASCII) encoding. In some cases, a UE may store a table that maps character strings to application identifiers of different applications. The UE may receive a NSSP traffic descriptor that includes the character string (e.g., encoded character string), identify (e.g., using the table) an application identifier of an application based on the received character string, establish a connection with a network slice based on the identified application identifier, and communicate data service traffic of the application using the established connection.

Aspects of the disclosure are initially described in the context of wireless communications systems. Additionally, aspects of the disclosure may be illustrated through an additional wireless communications system, a network slice mapping configuration, and a process flow. Aspects of the disclosure are further illustrated by and described with reference to apparatus diagrams, system diagrams, and flow-charts that relate to network slicing traffic descriptor encoding.

FIG. 1 illustrates an example of a wireless communications system 100 that supports network slicing traffic descriptor encoding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE

115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a band-width part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100 (e.g., a 5G system), the functions of the core network 130 may be virtualized to allow for a more flexible architecture. Specifically, the core network 130 may include several entities (or functions) such as an authentication server function (AUSF), an AMF, an SMF, etc. implemented in software. Wireless communications system 100 may also support the use of network slices to support additional features and network function optimizations. A network slice (e.g., network sections, sub-networks, etc.) may be a logical end-to-end network that can be dynamically created.

For example, a UE 115 may establish a PDU session for a logical data network, where the logical data network may be referred to as a network slice. In some cases, the UE 115 may select a network slice based on an application or subscription service. For example, the UE 115 may have an application that is an IMS voice application, and the UE 115 may select a network slice that is configured to support this mobile broadband application. The UE 115 may, additionally or alternatively, have an application that is configured as an IoT application; for example, the IoT application may configure the UE 115 to operate as an IoT gateway device that compiles and transmits data to a remote server, periodically. As such, the UE 115 may use a network slice that is configured to support massive IoT data traffic. Additionally or alternatively, the network slices may provide different levels of service. For example, the UE 115 may use different types of communications with differing latency and reliability requirements, such that a first type of communication (e.g., URLLC) may be communicated over a first network slice with higher service levels and a second type of communication (e.g., eMBB traffic) may be communicated over a second network slice with lower service levels. By having different network slices serving different applications, subscriptions, etc., the UE 115 may improve its resource utilization in a network, while also satisfying performance requirements of individual applications (e.g., quality of service (QoS) requirements) of the UE 115.

Using network slices may enable multiplexing of virtualized and independent logical networks on a same physical network infrastructure. Each network slice may include an isolated end-to-end network tailored to meet different requirements (e.g., QoS, different application profiles, usage, etc.) requested by a particular application. For example, different applications of a UE 115 may include services with different service level requirements. As such, the network slices may enable a flexible and scalable configuration on top of a common network infrastructure to meet the differing service level requirements for the different applications. In some cases, the different network slices may be administered by separate operators (e.g., mobile virtual network operators), where an infrastructure provider leases physical resources to these operators that share the underlying physical network of the infrastructure provider. The operators may then deploy multiple network slices customized to the different applications provided to users associated with the operators.

Additionally, network slicing may enable a mobile operator to create specific virtual networks that cater to particular clients and use cases. For example, certain applications (e.g., such as eMBB communications, machine-to-machine (M2M) communications in manufacturing or logistics, smart cars, etc.) may benefit from leveraging different aspects of wireless communications. A first application may use higher speeds, a second application may use low latency, a third application may use edge computing resources, etc. By creating separate slices that prioritize specific resources, a mobile operator may offer tailored solutions to particular industries. For example, different industries (e.g., marketing, augmented reality, mobile gaming, etc.) may use these network slices for meeting corresponding requirements for the industries. Additionally, network slicing may also enhance service continuity via improved roaming across networks by creating a virtual network running on a physical infrastructure that spans multiple local or national networks, by allowing a host network to create an optimized virtual network which replicates the one offered by a home network for a roaming device (e.g., a UE 115), etc.

The network slices may be served by different network functions (e.g., AMF, SMF, etc.). The network may, in some cases, provide NSSAI or an S-NSSAI to the UE 115. The NSSAI may include information indicating allowed or supported network slices for the UE 115 to use, among other information. A data network may be associated with an S-NSSAI. In some cases, a network operator may provide to a UE 115 an NSSP. The NSSP may include one or more NSSP rules, each one associating an application with a certain S-NSSAI. In some cases, a default rule may match all applications to a S-NSSAI. In some cases, a UE application associated with an S-NSSAI may request data transmission.

Additionally, the NSSP may include a traffic descriptor that includes a character string corresponding to an application of the UE 115 (e.g., an operating system application identifier field). The NSSP may enable the UE 115 to index an application to a particular network slicing instance. The UE 115 may use this traffic descriptor to search and match traffic to an application in running in an operating system for the UE 115. A PLMN may provide the UE 115 with a list of traffic descriptors associated with each application of the UE 115, where each traffic descriptor indicates a network slice (e.g., from a set of available network slices) for providing data service to the corresponding application. Each traffic descriptor may include an application identifier (e.g., an operating system application identifier field) indicating the corresponding application. Thus, when an application requests a new data service, the UE 115 may match the application identifier of the requesting application to the application identifier within a traffic descriptor. The UE 115 may then transmit a data service request associated with the network slice indicated by the traffic descriptor. However, this traffic descriptor may not be encoded.

An NSSP traffic descriptor (e.g., traffic descriptor) for an operating system application identifier field (e.g., corresponding to an application) may be a core component for the UE 115 to index an application to a network slicing instance. The UE 115 may use this operating system application identifier field to search and match a detailed application in a running operating system to a corresponding network slice. In some cases, this NSSP traffic descriptor may include one (1) octet length field and the operating system identifier field. Conventional techniques do not provide for encoding this operating system application identifier. Encoding of an operating system application identifier may be desirable and could be utilized by UE vendors, application vendors, operating system vendors, operators, governments, etc. The techniques discussed herein provide for efficiently encoding an operating system application identifier field efficiently, and provide for how to encode or index large set of different applications using a single operating system application identifier in a traffic description.

Wireless communications system 100 may support efficient techniques for encoding the operating system application identifier. For example, a network entity (e.g., a base station 105) may encode an application identifier to generate a character string (e.g., operating system application identifier field) to include in the NSSP traffic descriptor using ASCII encoding. In some cases, a UE may store a table that maps character strings to application identifiers of a set of different applications. The UE may receive the NSSP traffic descriptor that includes the character string (e.g., encoded character string to indicate the operating system application identifier field), identify (e.g., using the table) an application identifier of an application based on the received character string, establish a connection with a network slice based on the identified application identifier, and communicate data service traffic of the application using the established connection.

Figure 2:
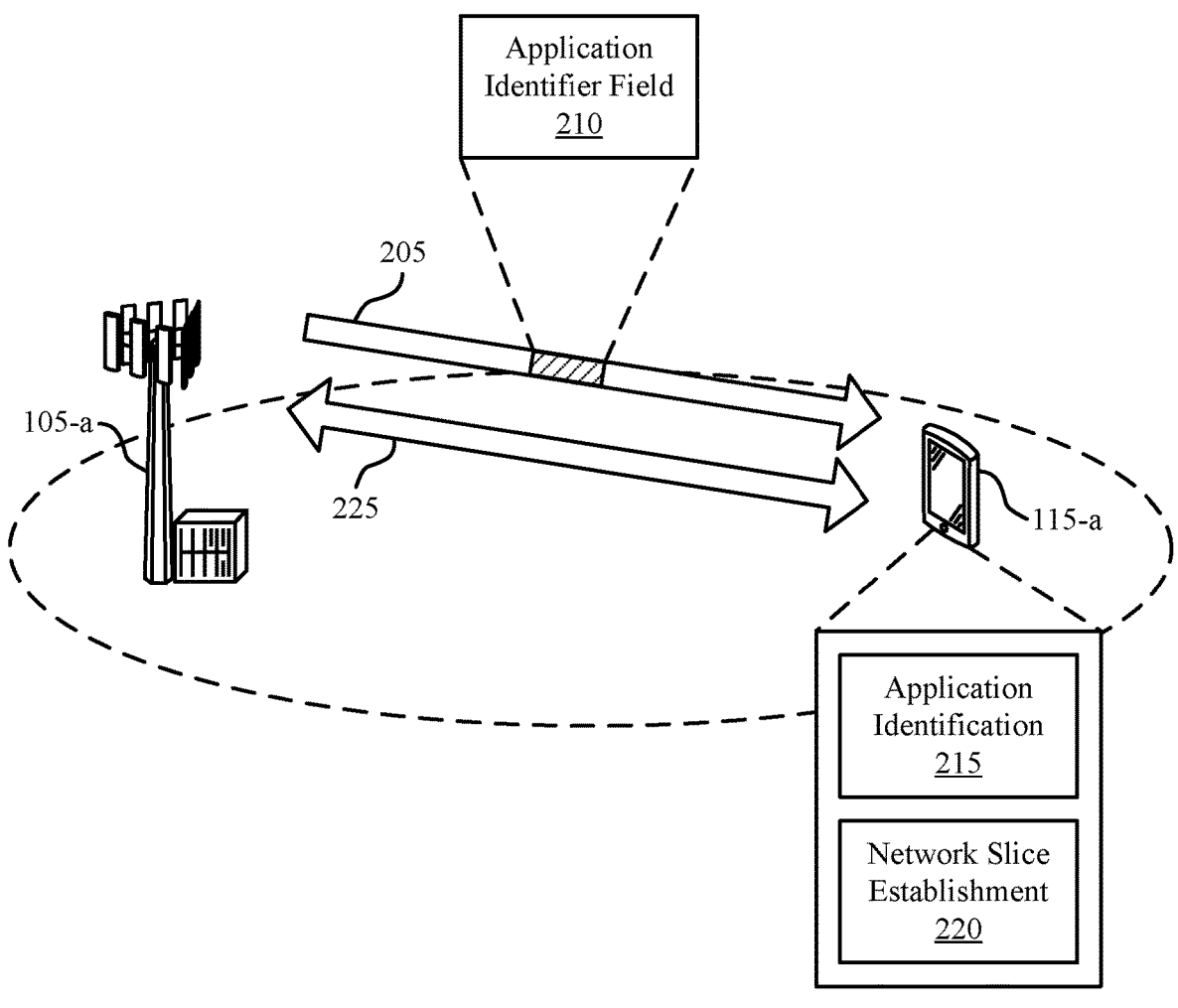
FIG. 2 illustrates an example of a wireless communications system that supports network slicing traffic descriptor encoding in accordance with aspects of the present disclosure.

FIG. 2 illustrates an example of a wireless communications system 200 that supports network slicing traffic descriptor encoding in accordance with aspects of the present disclosure. In some examples, wireless communications system 200 may implement aspects of wireless communications system 100. For example, wireless communications system 200 may include a base station 105-*a* and a UE 115-*a*, which may be examples of corresponding base stations 105 and UEs 115, respectively, as described above with reference to FIG. 1. Additionally, UE 115-*a* may use one or more network slices as part of communicating with base station 105-*a*. In some cases, UE 115-*a* may include multiple applications, where different applications of the multiple applications correspond to network slices of the one or more network slices (e.g., different applications may correspond to a same network slice or to different network slices).

As described herein, base station 105-*a* may transmit a traffic description that includes an application identifier field 210 to UE 115-*a* on resources of a carrier 205. For example, the application identifier field 210 may be included in an NSSP traffic descriptor for an application of UE 115-*a* (e.g., one (1) octet length field with an operating system identifier field). The NSSP traffic descriptor may include an operating system application identifier field for the application of UE 115-*a*. Additionally, base station 105-*a* may encode the application identifier field 210. For example, base station 105-*a* may encode the application identifier field 210 using ASCII to index or match one or more applications of UE 115-*a* to a corresponding identifier. That is, the encoding of the application identifier field 210 may directly use character strings to index applications of UE 115-*a*. In some cases, application vendors may submit an application identifier field 210 (e.g., operating system application identifier fields) using ASCII to an operator (e.g., base station 105-*a*), and the operator may update this application identifier field 210 to UE 115-*a*. UE 115-*a* may then use this ASCII character string (e.g., encoded application identifier field 210) to match an application unique identifier in its operating system to the corresponding application and identify a corresponding network slice for the application.

For example, a fitness application of UE 115-*a* (e.g., a first application) may include an encoded character string (e.g., com.apple.Fitness. 2020-pro) to indicate the fitness application that corresponds to a network slice. Accordingly, the application identifier field 210 may include this encoded character string, where UE 115-*a* then decodes the bits of the character string included in the application identifier field 210 as part of an application identification 215 to identify the corresponding fitness application. Subsequently, UE 115-*a* may then identify a network slice corresponding to the fitness application. UE 115-*a* may then establish a connection with this corresponding network slice as part of a network slice establishment 220.

In some cases, UE 115-*a* may establish the connection with the corresponding network slice based on transmitting a registration request with the decoded application identifier field 210 to register the application with the corresponding network slice. Additionally, after the connection with the network slice is established, UE 115-*a* may transmit a data service request to the network slice via the connection using the decoded application identifier field 210, where the data service request includes a request for a data service for the application. Subsequently, UE 115-*a* may then communicate data service traffic for the application with the corresponding network slice on resources of a carrier 225.

Additionally, UE 115-*a* may receive an indication of an application table that includes a set of character strings for matching to a set of application identifiers for applications stored by the UE 115-*a*. Accordingly, after decoding the application identifier field 210 to identify the character string, UE 115-*a* may use this application table to determine which application corresponds to the character string (e.g., as part of the application identification 215). For example, UE 115-*a* may index the application table using the character string received in the traffic descriptor to identify a corresponding application identifier for the application. Subsequently, UE 115-*a* may then use the determined application from the application table to determine the corresponding network slice for that application and establish the connection with the determined corresponding network slice.

In some operating systems, applications corresponding to a particular operating system may use a single unique bundle identifier during a lifetime for the applications (e.g., up to 10+ years). For example, Table 1 below may show a unique bundle identifier that is shared for different applications of UE 115-*a*.

TABLE 1

| Bundle Identifiers for Different Applications | |
| --- | --- |
| Application Name | Bundle Identifier |
| Activity | com.apple.Fitness |
| App Store | com.apple.AppStore |
| Books | com.apple.iBooks |

The unique bundle identifier may include the partial character string "com.apple" common for each of the applications and then a corresponding identifier for the application (e.g., "Fitness," "AppStore," "iBooks," etc.). The application identifier field 210 may include an encoded set of bits (e.g., via ASCII) to represent the bundle identifier (e.g., character string) for an application. UE 115-*a* may then identify the application corresponding to the bundle identifier (e.g., based on Table 1 or a similar application table). Additionally, UE 115-*a* may identify the network slice to use for data service traffic communications for the identified application and establish a connection with that network slice to then communicate the data service traffic for that application.

Figure 3:
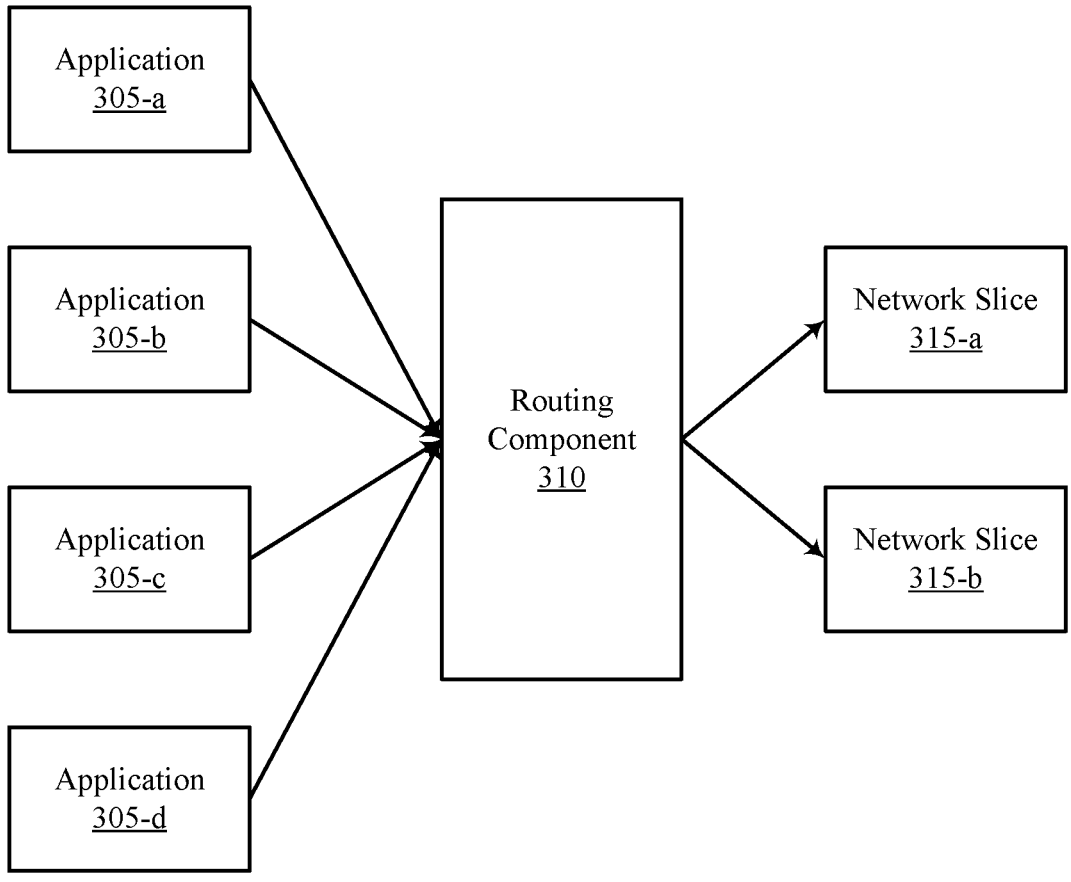
FIG. 3 illustrates an example of a network slice mapping configuration that supports network slicing traffic descriptor encoding in accordance with aspects of the present disclosure.

FIG. 3 illustrates an example of an application routing configuration 300 that supports network slicing traffic descriptor encoding in accordance with aspects of the present disclosure. In some examples, application routing configuration 300 may implement aspects of wireless communications systems 100 and 200. For example, a UE 115 and a base station 105 may use application routing configuration 300 to determine which applications 305 are mapped to different network slices 315.

In some cases, a routing component 310 may be used to determine the mapping or routing between an application 305 to a network slice 315. For example, each application 305 may include a unique identifier for the application 305 (e.g., a bundle identifier, an application identifier field, etc.). The routing component 310 may use information for each application 305 along with an NSSP traffic descriptor (e.g., for each application 305, common to all applications 305, etc.) to identify which applications 305 correspond to which network slice 315. As an example, a first application 305-*a* and a second application 305-*b* may use a first network slice 315-*a*, and a third application 305-*c* and a fourth application 305-*d* may use a second network slice 315-*b*. The first network slice 315-*a* may provide different service level requirements (e.g., QoS, latency, reliability, resource locations, etc.) than the second network slice 315-*b*, where the applications 305 are matched to the different network slices 315 based in part on these different service level requirements.

After the routing component 310 is used to identify which applications 305 are mapped to which network slice, this information may be included in control signaling transmitted to the UE 115. Additionally, the control signaling may include an application table that matches different applications for the UE 115 to their corresponding unique identifiers (e.g., operating system application identifier field, application identifier field, character string, etc.). As described herein, the base station 105 may then encode the unique identifier for an application (e.g., via ASCII) into a set of encoded bits that form a character string and transmit the character string to the UE 115 within an NSSP traffic descriptor for the application. Accordingly, after decoding the set of encoded bits to obtain the character string, the UE 115 may identify the unique identifier for the application (e.g., based on the application table) that corresponds to the character string. Additionally, the UE 115 may then identify the corresponding network slice for the application based on the control signaling and may establish a connection with the corresponding network slice for communicating traffic (e.g., data service traffic) for the application.

Figure 4:
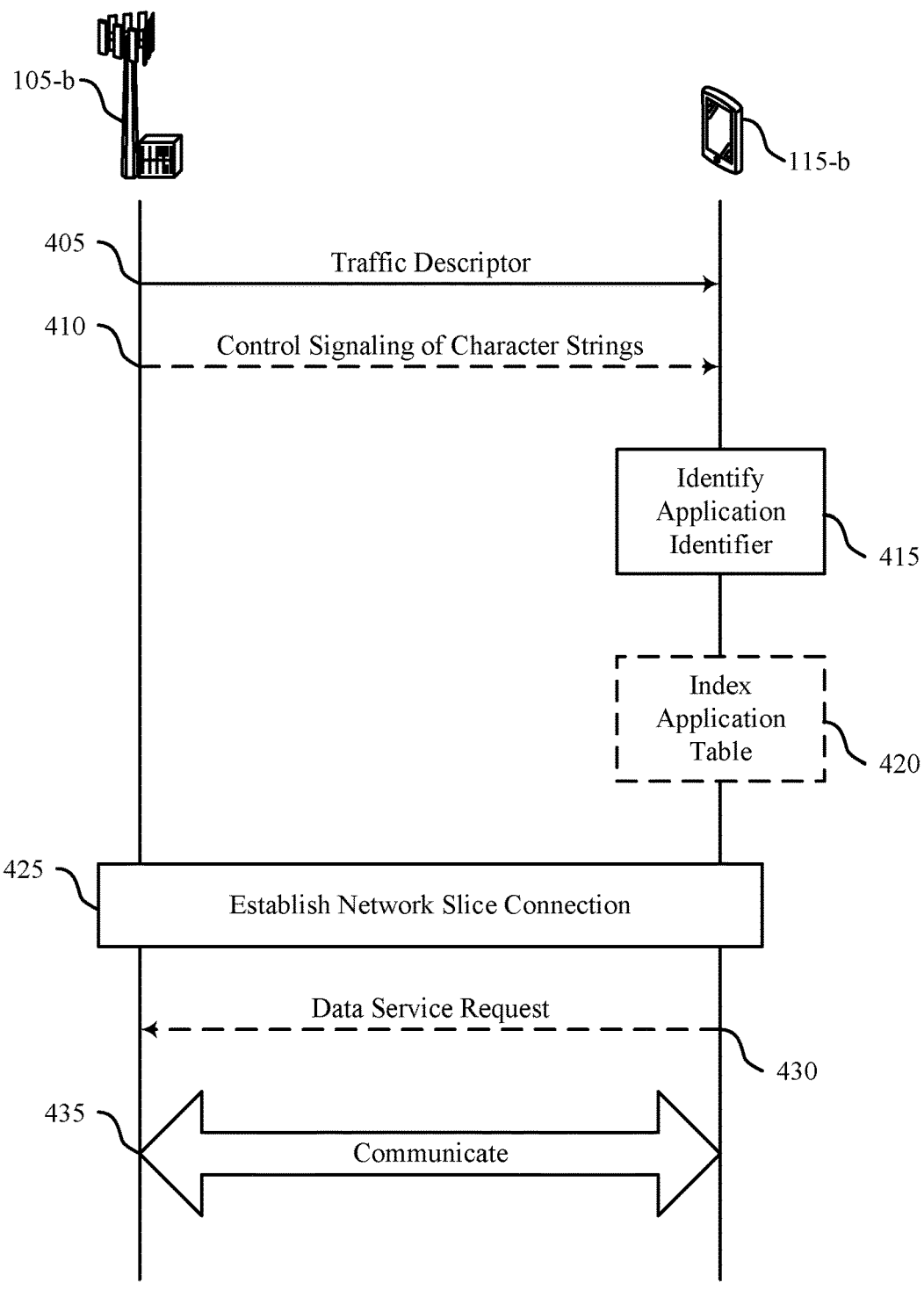
FIG. 4 illustrates an example of a process flow that supports network slicing traffic descriptor encoding in accordance with aspects of the present disclosure.

FIG. 4 illustrates an example of a process flow 400 that supports network slicing traffic descriptor encoding in accordance with aspects of the present disclosure. In some examples, process flow 400 may implement aspects of wireless communications systems 100 and 200. For example, process flow 400 may include a base station 105-*b* and a UE 115-*b*, which may be examples of corresponding base stations 105 and UEs 115, respectively, as described above with reference to FIGS. 1-3.

In the following description of the process flow 400, the operations between UE 115-*b* and base station 105-*b* may be transmitted in a different order than the exemplary order shown, or the operations performed by UE 115-*b* and base station 105-*b* may be performed in different orders or at different times. Certain operations may also be left out of the process flow 400, or other operations may be added to the process flow 400. It is to be understood that while UE 115-*b* and base station 105-*b* are shown performing a number of the operations of process flow 400, any wireless device may perform the operations shown.

At 405, UE 115-*b* may receive (e.g., from base station 105-*b*) a traffic descriptor that includes a character string corresponding to a first application of UE 115-*b*. In some cases, UE 115-*b* may receive the traffic descriptor that includes the character string with a set of bits encoded to represent a sequence of characters in the character string. For example, UE 115-*b* may receive the traffic descriptor that includes the character string with a set of bits encoded using ASCII encoding to represent a sequence of characters in the character string. Additionally, UE 115-*b* may receive the traffic descriptor that is an NSSP traffic descriptor, a field having an octet length, or a combination thereof.

At 410, UE 115-*b* may receive (e.g., from base station 105-*b*) control signaling that indicates a set of character strings for a set of applications listed in an application table.

At 415, UE 115-*b* may identify a first application identifier of the first application based on the character string. For example, UE 115-*b* may decode the set of bits to obtain the character string (e.g., to then identify the first application identifier). In some cases, the first application identifier may be an operating system application identifier.

At 420, UE 115-*b* may index an application table to identify the first application identifier based on the character string.

At 425, UE 115-*b* may establish a connection with a first network slice of a set of available network slices (e.g., via base station 105-*b*) based on a first application identifier. In some cases, UE 115-*b* may transmit a registration request that includes the character string to request to register the first application with the first network slice of the set of available network slices.

At 430, UE 115-*b* may transmit, via the connection, a data service request that requests a data service for the first application and includes the character string of the application. For example, the requesting application may provide its application identifier to a modem of the UE 115-*b*. The modem of the UE 115-*b* may use the application identifier to index an application table to identify a character string corresponding to the application identifier of the requesting application. The modem of the UE 115-*b* may transmit the data service request that requests a data service for the first application and includes the character string of the application.

At 435, UE 115-*b* may communicate, via the connection with the first network slice, data service traffic of the first application corresponding to the first application identifier. In some cases, the data service traffic may be communicated based on the registration request. The data service traffic may include the character string of the requesting application. In the downlink direction, the modem of the UE 115-*b* may use the character string received in the data service traffic to index an application table to identify an application identifier corresponding to the character string. The modem of the UE115-*b* may then route the downlink data service traffic to the application corresponding to the application identifier retrieved from the application table. In the uplink direction, the application may provide data service traffic with its application identifier to the modem of the UE 115-*b*. The modem may index the application table using the application identifier to identify a character string corresponding to the application. The modem of the UE 115-*b* may transmit the uplink data service traffic along with the character string to the base station 105-*b* for routing to the corresponding network slice. Beneficially, the character string (e.g., an ASCII string) in an application identifier field (e.g., "OS App Id field") of a traffic descriptor may be, in some examples, uniquely matched to an application identifier of an application of an operating system of the UE 115-*b*.

Figure 5:
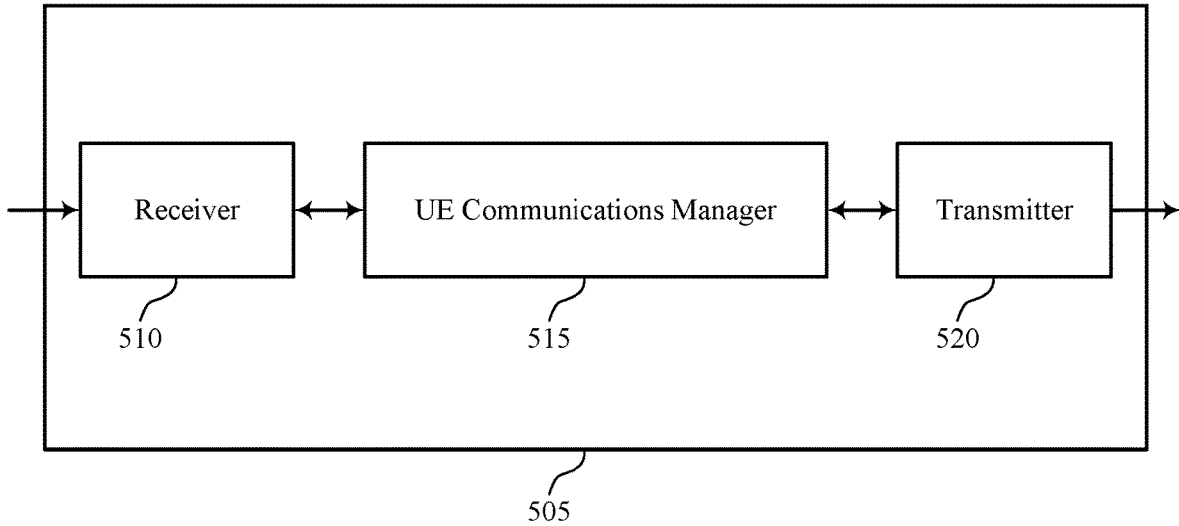
FIGS. 5 and 6 show block diagrams of devices that support network slicing traffic descriptor encoding in accordance with aspects of the present disclosure.

FIG. 5 shows a block diagram 500 of a device 505 that supports network slicing traffic descriptor encoding in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to network slicing traffic descriptor encoding, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive a traffic descriptor including a character string corresponding to a first application of the UE. In some cases, the UE communications manager 515 may identify a first application identifier of the first application based on the character string. Additionally, the UE communications manager 515 may establish a connection with a first network slice of a set of available network slices based on the first application identifier. Subsequently, the UE communications manager 515 may communicate, via the connection with the first network slice, data service traffic of the first application corresponding to the first application identifier. The UE communications manager 515 may be an example of aspects of the UE communications manager 810 described herein.

The actions performed by the UE communications manager 515 as described herein may support improvements in communications. In one or more aspects, the UE communications manager 515 may enable a UE to identify an identifier for an application based on a character string representing the identifier. For example, the identifier may be encoded (e.g., using ASCII encoding) that is common to multiple applications. Additionally, the encoding may enable different applications to use a same type of operating system application identifier field to indicate corresponding applications, thereby reducing computational complexity at the UE.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
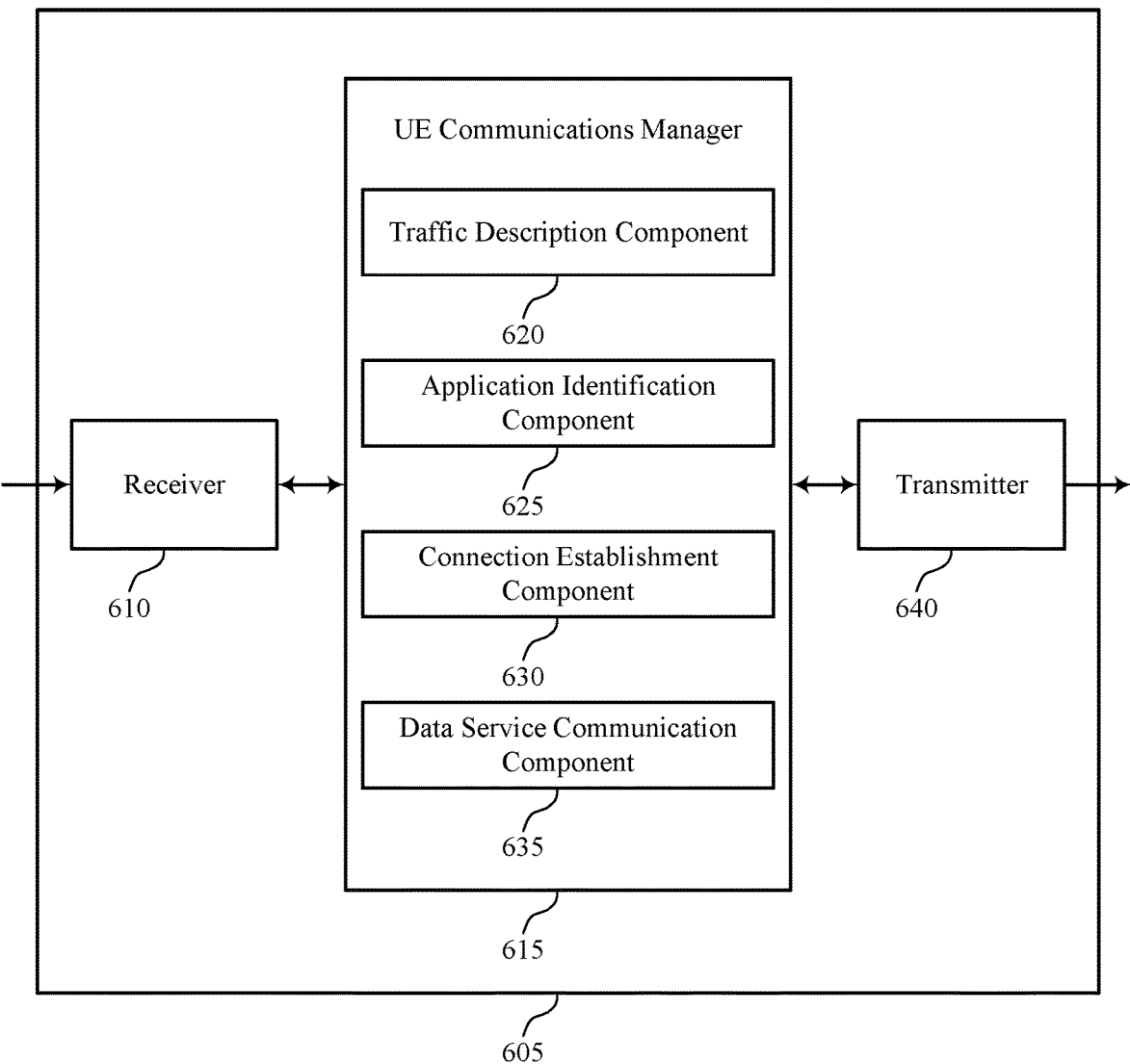

FIG. 6 shows a block diagram 600 of a device 605 that supports network slicing traffic descriptor encoding in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to network slicing traffic descriptor encoding, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a traffic description component 620, an application identification component 625, a connection establishment component 630, and a data service communication component 635. The UE communications manager 615 may be an example of aspects of the UE communications manager 810 described herein.

The traffic description component 620 may receive a traffic descriptor including a character string corresponding to a first application of the UE.

The application identification component 625 may identify a first application identifier of the first application based on the character string.

The connection establishment component 630 may establish a connection with a first network slice of a set of available network slices based on the first application identifier.

The data service communication component 635 may communicate, via the connection with the first network slice, data service traffic of the first application corresponding to the first application identifier.

Based on identifying an application identifier of an application based on an encoded character string, a processor of a UE (e.g., a processor controlling the receiver 610, the UE communications manager 615, the transmitter 640, a transceiver 820 described with reference to FIG. 8, or a combination thereof) may decode the encoded character string in a same manner regardless of the application. As a result, the processor of the UE may reduce batter power consumption and processing power when determining the application identifier with the same type of encoding/decoding being used, thereby resulting in more efficient communications.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
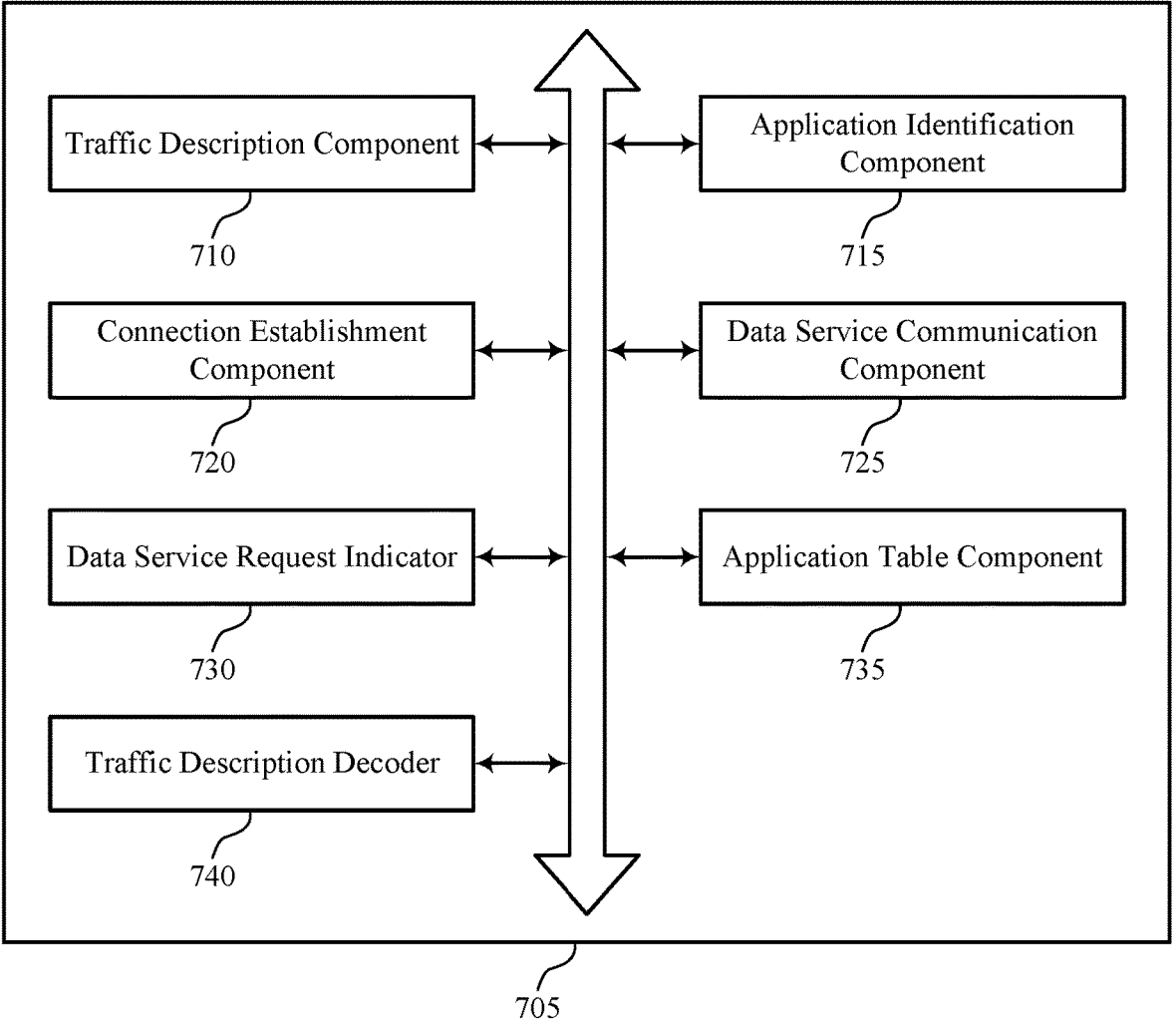
FIG. 7 shows a block diagram of a user equipment (UE) communications manager that supports network slicing traffic descriptor encoding in accordance with aspects of the present disclosure.

FIG. 7 shows a block diagram 700 of a UE communications manager 705 that supports network slicing traffic descriptor encoding in accordance with aspects of the present disclosure. The UE communications manager 705 may be an example of aspects of a UE communications manager 515, a UE communications manager 615, or a UE communications manager 810 described herein. The UE communications manager 705 may include a traffic description component 710, an application identification component 715, a connection establishment component 720, a data service communication component 725, a data service request indicator 730, an application table component 735, and a traffic description decoder 740. Each of these modules may communicate, directly or indirectly, with one another (e.g., via one or more buses).

The traffic description component 710 may receive a traffic descriptor including a character string corresponding to a first application of the UE. In some examples, the traffic description component 710 may receive the traffic descriptor that is an NSSP traffic descriptor. Additionally, the traffic description component 710 may receive the traffic descriptor including the character string that is a field having an octet length.

The application identification component 715 may identify a first application identifier of the first application based on the character string.

The connection establishment component 720 may establish a connection with a first network slice of a set of available network slices based on the first application identifier. In some examples, the connection establishment component 720 may transmit a registration request including the character string that requests to register the first application with the first network slice of the set of available network slices, where the data service traffic is communicated based on the registration request.

The data service communication component 725 may communicate, via the connection with the first network slice, data service traffic of the first application corresponding to the first application identifier.

The data service request indicator 730 may transmit, via the connection, a data service request that requests a data service for the first application and includes the character string, where the data service traffic is communicated based on the data service request.

The application table component 735 may receive control signaling that indicates a set of character strings for a set of applications listed in an application table. Additionally, the application table component 735 may index an application table to identify the first application identifier based on the character string.

The traffic description decoder 740 may receive the traffic descriptor including the character string that includes a set of bits encoded to represent a sequence of characters in the character string. In some examples, the traffic description decoder 740 may decode the set of bits to obtain the character string. Additionally or alternatively, the traffic description decoder 740 may receive the traffic descriptor including the character string that includes a set of bits encoded using ASCII encoding to represent a sequence of characters in the character string.

Figure 8:
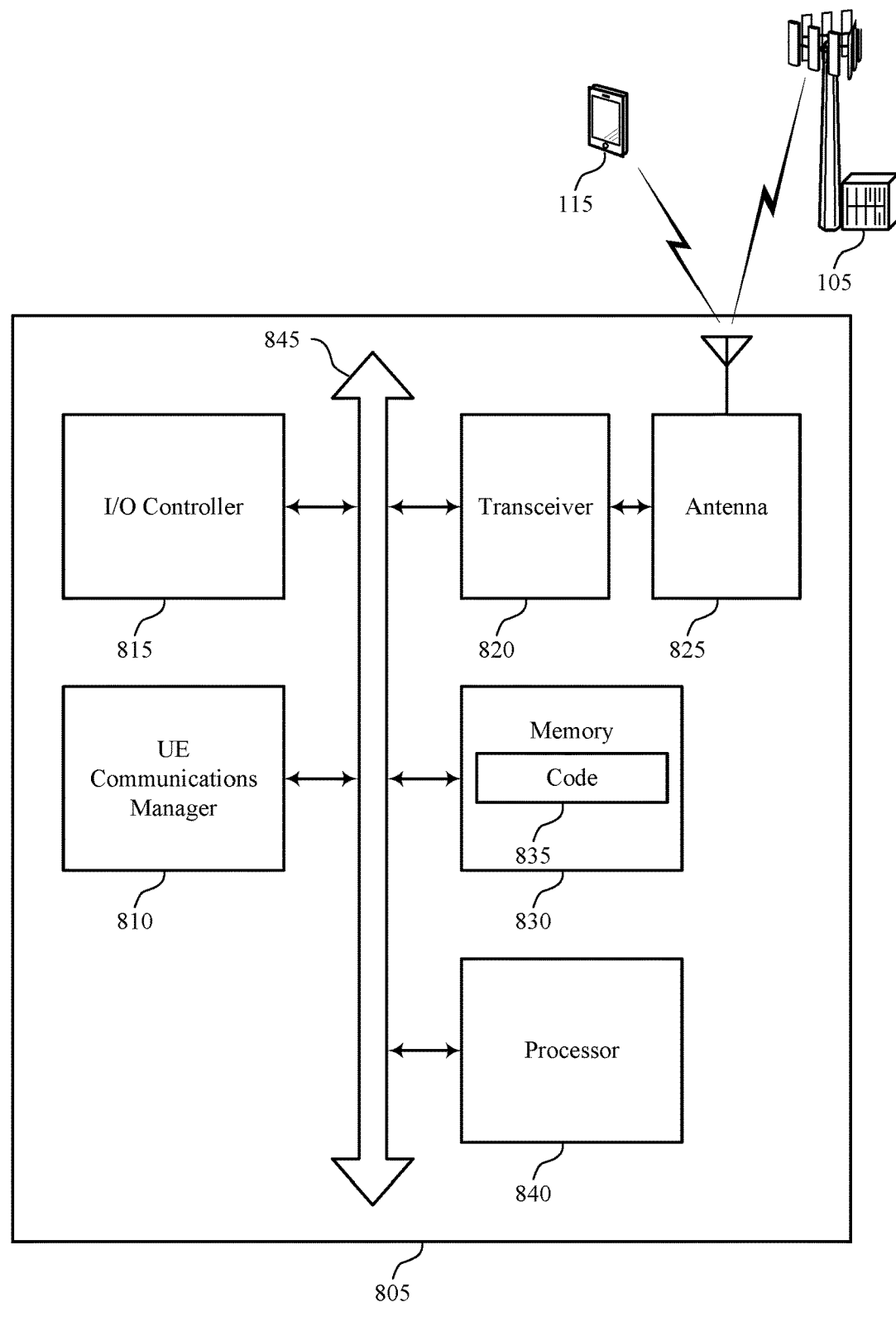
FIG. 8 shows a diagram of a system including a device that supports network slicing traffic descriptor encoding in accordance with aspects of the present disclosure.

FIG. 8 shows a diagram of a system 800 including a device 805 that supports network slicing traffic descriptor encoding in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive a traffic descriptor including a character string corresponding to a first application of the UE. In some cases, the UE communications manager 810 may identify a first application identifier of the first application based on the character string. Additionally, the UE communications manager 810 may establish a connection with a first network slice of a set of available network slices based on the first application identifier. Subsequently, the UE communications manager 810 may communicate, via the connection with the first network slice, data service traffic of the first application corresponding to the first application identifier.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting network slicing traffic descriptor encoding).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
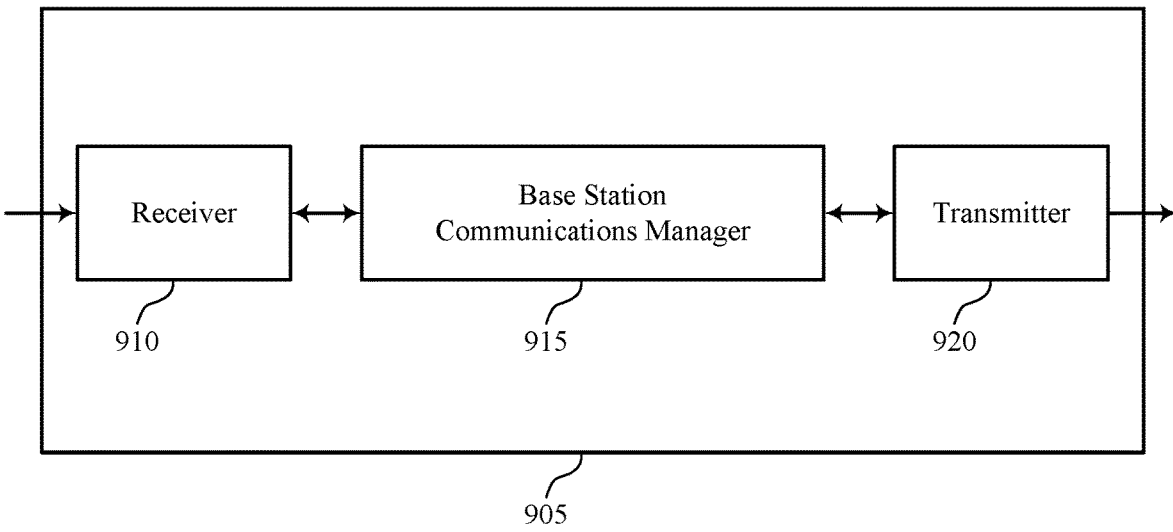
FIGS. 9 and 10 show block diagrams of devices that support network slicing traffic descriptor encoding in accordance with aspects of the present disclosure.

FIG. 9 shows a block diagram 900 of a device 905 that supports network slicing traffic descriptor encoding in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to network slicing traffic descriptor encoding, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, a traffic descriptor including a character string corresponding to a first application identifier of a first application. In some cases, the base station communications manager 915 may establish a connection between the UE and a first network slice of a set of available network slices based on the first application identifier. Additionally, the base station communications manager 915 may communicate, via the connection with the first network slice, data service traffic of the first application corresponding to the first application identifier. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
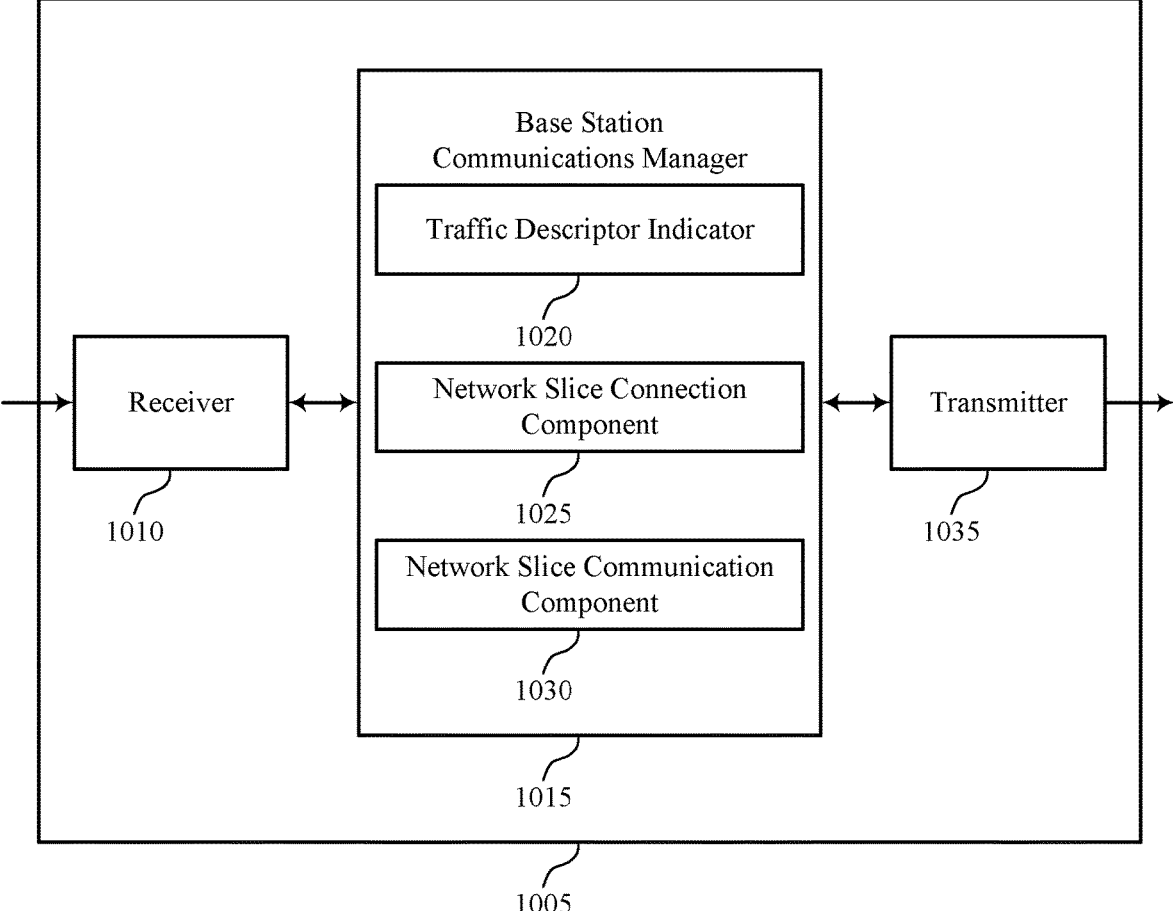

FIG. 10 shows a block diagram 1000 of a device 1005 that supports network slicing traffic descriptor encoding in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to network slicing traffic descriptor encoding, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a traffic descriptor indicator 1020, a network slice connection component 1025, and a network slice communication component 1030. The base station communications manager 1015 may be an example of aspects of the base station communications manager 1210 described herein.

The traffic descriptor indicator 1020 may transmit, to a UE, a traffic descriptor including a character string corresponding to a first application identifier of a first application.

The network slice connection component 1025 may establish a connection between the UE and a first network slice of a set of available network slices based on the first application identifier.

The network slice communication component 1030 may communicate, via the connection with the first network slice, data service traffic of the first application corresponding to the first application identifier.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
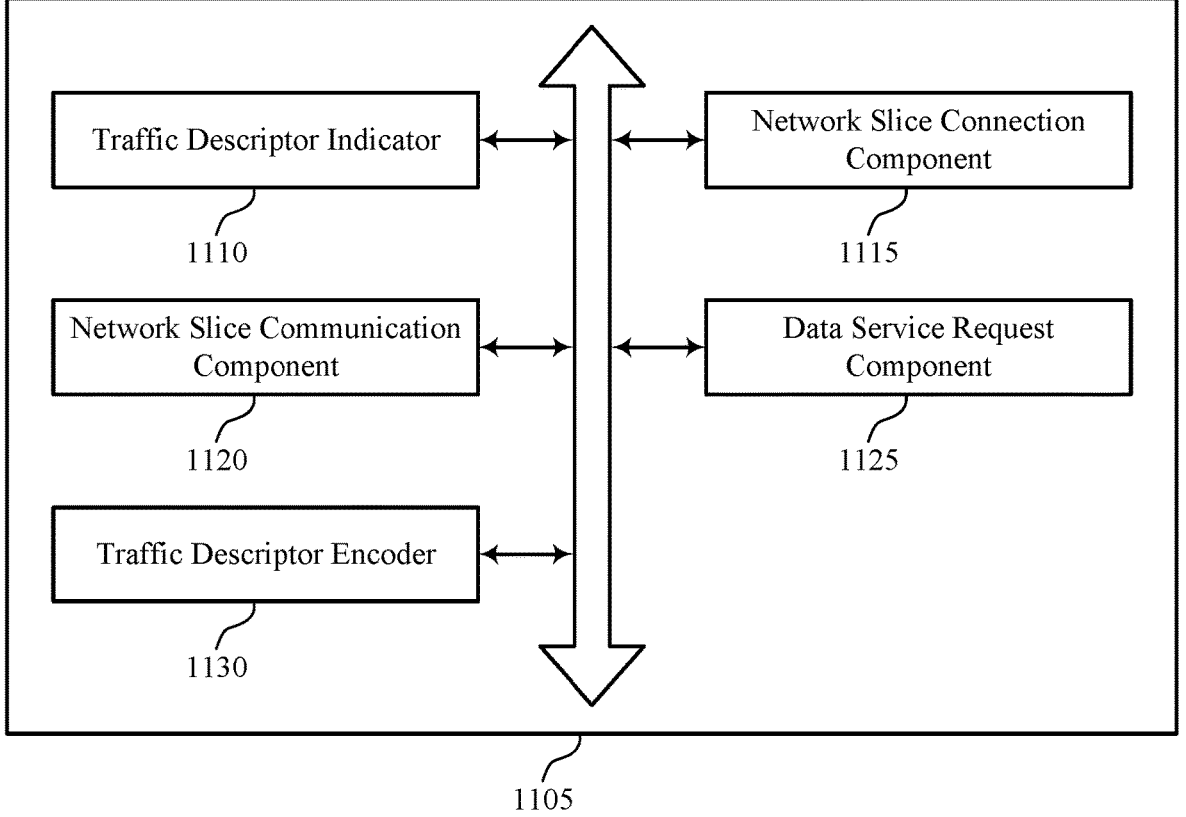
FIG. 11 shows a block diagram of a base station communications manager that supports network slicing traffic descriptor encoding in accordance with aspects of the present disclosure.

FIG. 11 shows a block diagram 1100 of a base station communications manager 1105 that supports network slicing traffic descriptor encoding in accordance with aspects of the present disclosure. The base station communications manager 1105 may be an example of aspects of a base station communications manager 915, a base station communications manager 1015, or a base station communications manager 1210 described herein. The base station communications manager 1105 may include a traffic descriptor indicator 1110, a network slice connection component 1115, a network slice communication component 1120, a data service request component 1125, and a traffic descriptor encoder 1130. Each of these modules may communicate, directly or indirectly, with one another (e.g., via one or more buses).

The traffic descriptor indicator 1110 may transmit, to a UE, a traffic descriptor including a character string corresponding to a first application identifier of a first application. In some cases, the first application identifier may be an operating system application identifier. In some examples, the traffic descriptor indicator 1110 may transmit control signaling that indicates a set of character strings for a set of applications listed in an application table. Additionally or alternatively, the traffic descriptor indicator 1110 may transmit the traffic descriptor that is an NS SP traffic descriptor. In some examples, the traffic descriptor indicator 1110 may transmit the traffic descriptor including the character string that is a field having an octet length.

The network slice connection component 1115 may establish a connection between the UE and a first network slice of a set of available network slices based on the first application identifier. In some examples, the network slice connection component 1115 may receive a registration request including the character string that requests to register the first application with the first network slice of the set of available network slices, where the data service traffic is communicated based on the registration request.

The network slice communication component 1120 may communicate, via the connection with the first network slice, data service traffic of the first application corresponding to the first application identifier.

The data service request component 1125 may receive, via the connection, a data service request that requests a data service for the first application and includes the character string, where the data service traffic is communicated based on the data service request.

The traffic descriptor encoder 1130 may transmit the traffic descriptor including the character string that includes a set of bits encoded to represent a sequence of characters in the character string. In some examples, the traffic descriptor encoder 1130 may encode the set of bits to obtain the character string. Additionally or alternatively, the traffic descriptor encoder 1130 may transmit the traffic descriptor including the character string that includes a set of bits encoded using ASCII encoding to represent a sequence of characters in the character string.

Figure 12:
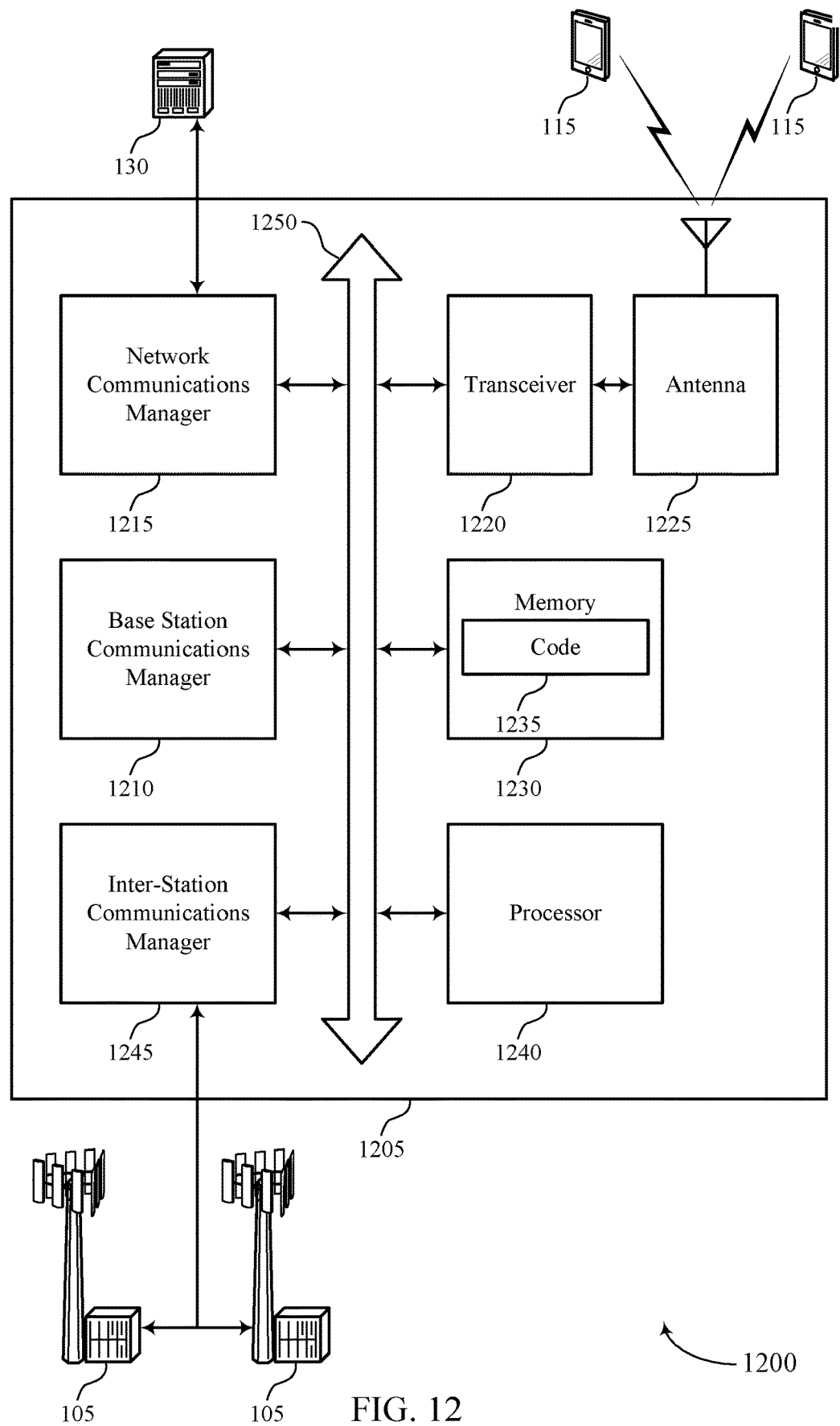
FIG. 12 shows a diagram of a system including a device that supports network slicing traffic descriptor encoding in accordance with aspects of the present disclosure.

FIG. 12 shows a diagram of a system 1200 including a device 1205 that supports network slicing traffic descriptor encoding in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, a traffic descriptor including a character string corresponding to a first application identifier of a first application. In some cases, the base station communications manager 1210 may establish a connection between the UE and a first network slice of a set of available network slices based on the first application identifier. Additionally, the base station communications manager 1210 may communicate, via the connection with the first network slice, data service traffic of the first application corresponding to the first application identifier.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting network slicing traffic descriptor encoding).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports network slicing traffic descriptor encoding in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a traffic descriptor including a character string corresponding to a first application of the UE. The operations of 1305 may be performed according to the methods described herein. In some examples, aspects of the operations of 1305 may be performed by a traffic description component as described with reference to FIGS. 5 through 8.

At 1310, the UE may identify a first application identifier of the first application based on the character string. The operations of 1310 may be performed according to the methods described herein. In some examples, aspects of the operations of 1310 may be performed by an application identification component as described with reference to FIGS. 5 through 8.

At 1315, the UE may establish a connection with a first network slice of a set of available network slices based on the first application identifier. The operations of 1315 may be performed according to the methods described herein. In some examples, aspects of the operations of 1315 may be performed by a connection establishment component as described with reference to FIGS. 5 through 8.

At 1320, the UE may communicate, via the connection with the first network slice, data service traffic of the first application corresponding to the first application identifier. The operations of 1320 may be performed according to the methods described herein. In some examples, aspects of the operations of 1320 may be performed by a data service communication component as described with reference to FIGS. 5 through 8.

FIG. 14 shows a flowchart illustrating a method 1400 that supports network slicing traffic descriptor encoding in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a traffic descriptor including a character string corresponding to a first application of the UE. The operations of 1405 may be performed according to the methods described herein. In some examples, aspects of the operations of 1405 may be performed by a traffic description component as described with reference to FIGS. 5 through 8.

At 1410, the UE may identify a first application identifier of the first application based on the character string. The operations of 1410 may be performed according to the methods described herein. In some examples, aspects of the operations of 1410 may be performed by an application identification component as described with reference to FIGS. 5 through 8.

At 1415, the UE may establish a connection with a first network slice of a set of available network slices based on the first application identifier. The operations of 1415 may be performed according to the methods described herein. In some examples, aspects of the operations of 1415 may be performed by a connection establishment component as described with reference to FIGS. 5 through 8.

At 1420, the UE may communicate, via the connection with the first network slice, data service traffic of the first application corresponding to the first application identifier. The operations of 1420 may be performed according to the methods described herein. In some examples, aspects of the operations of 1420 may be performed by a data service communication component as described with reference to FIGS. 5 through 8.

At 1425, the UE may transmit, via the connection, a data service request that requests a data service for the first application and includes the character string, where the data service traffic is communicated based on the data service request. The operations of 1425 may be performed according to the methods described herein. In some examples, aspects of the operations of 1425 may be performed by a data service request indicator as described with reference to FIGS. 5 through 8.

FIG. 15 shows a flowchart illustrating a method 1500 that supports network slicing traffic descriptor encoding in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a traffic descriptor including a character string corresponding to a first application of the UE. The operations of 1505 may be performed according to the methods described herein. In some examples, aspects of the operations of 1505 may be performed by a traffic description component as described with reference to FIGS. 5 through 8.

At 1510, the UE may identify a first application identifier of the first application based on the character string. The operations of 1510 may be performed according to the methods described herein. In some examples, aspects of the operations of 1510 may be performed by an application identification component as described with reference to FIGS. 5 through 8.

At 1515, the UE may establish a connection with a first network slice of a set of available network slices based on the first application identifier. The operations of 1515 may be performed according to the methods described herein. In some examples, aspects of the operations of 1515 may be performed by a connection establishment component as described with reference to FIGS. 5 through 8.

At 1520, the UE may transmit a registration request including the character string that requests to register the first application with the first network slice of the set of available network slices, where the data service traffic is communicated based on the registration request. The operations of 1520 may be performed according to the methods described herein. In some examples, aspects of the operations of 1520 may be performed by a connection establishment component as described with reference to FIGS. 5 through 8.

At 1525, the UE may communicate, via the connection with the first network slice, data service traffic of the first application corresponding to the first application identifier. The operations of 1525 may be performed according to the methods described herein. In some examples, aspects of the operations of 1525 may be performed by a data service communication component as described with reference to FIGS. 5 through 8.

FIG. 16 shows a flowchart illustrating a method 1600 that supports network slicing traffic descriptor encoding in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a traffic descriptor including a character string corresponding to a first application identifier of a first application. The operations of 1605 may be performed according to the methods described herein. In some examples, aspects of the operations of 1605 may be performed by a traffic descriptor indicator as described with reference to FIGS. 9 through 12.

At 1610, the base station may establish a connection between the UE and a first network slice of a set of available network slices based on the first application identifier. The operations of 1610 may be performed according to the methods described herein. In some examples, aspects of the operations of 1610 may be performed by a network slice connection component as described with reference to FIGS. 9 through 12.

At 1615, the base station may communicate, via the connection with the first network slice, data service traffic of the first application corresponding to the first application identifier. The operations of 1615 may be performed according to the methods described herein. In some examples, aspects of the operations of 1615 may be performed by a network slice communication component as described with reference to FIGS. 9 through 12.

FIG. 17 shows a flowchart illustrating a method 1700 that supports network slicing traffic descriptor encoding in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a traffic descriptor including a character string corresponding to a first application identifier of a first application. The operations of 1705 may be performed according to the methods described herein. In some examples, aspects of the operations of 1705 may be performed by a traffic descriptor indicator as described with reference to FIGS. 9 through 12.

At 1710, the base station may transmit the traffic descriptor including the character string that includes a set of bits encoded to represent a sequence of characters in the character string. The operations of 1710 may be performed according to the methods described herein. In some examples, aspects of the operations of 1710 may be performed by a traffic descriptor encoder as described with reference to FIGS. 9 through 12.

At 1715, the base station may establish a connection between the UE and a first network slice of a set of available network slices based on the first application identifier. The operations of 1715 may be performed according to the methods described herein. In some examples, aspects of the operations of 1715 may be performed by a network slice connection component as described with reference to FIGS. 9 through 12.

At 1720, the base station may communicate, via the connection with the first network slice, data service traffic of the first application corresponding to the first application identifier. The operations of 1720 may be performed according to the methods described herein. In some examples, aspects of the operations of 1720 may be performed by a network slice communication component as described with reference to FIGS. 9 through 12.

Figure 18:
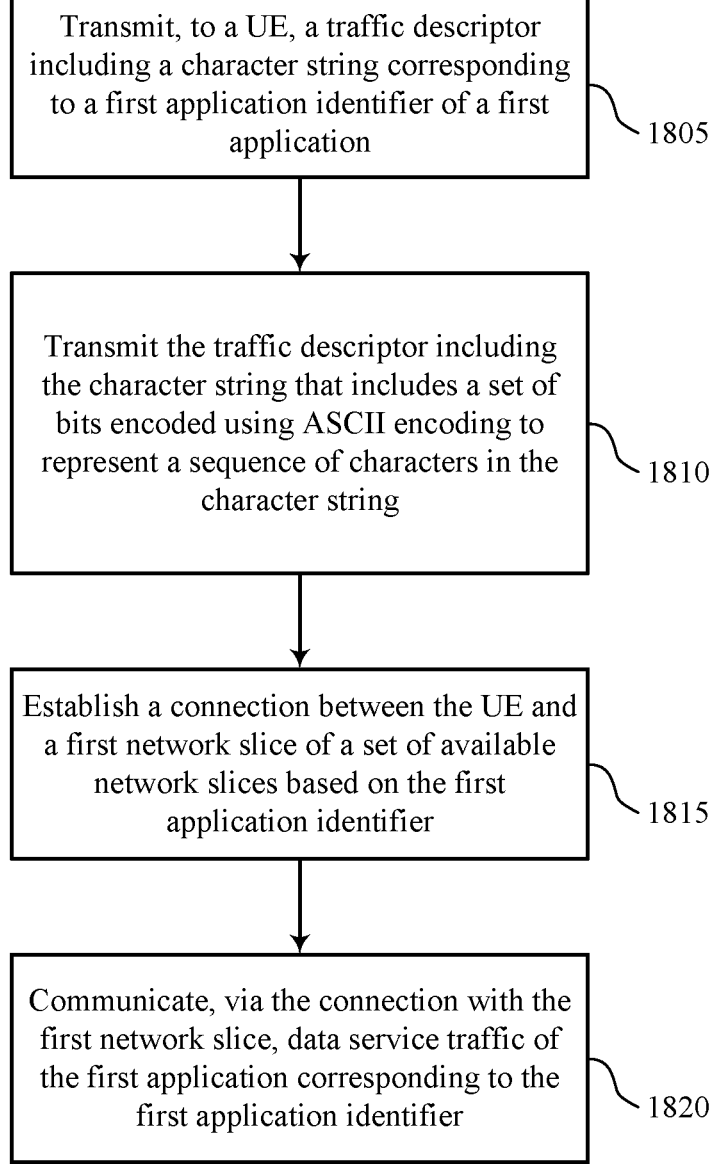

FIG. 18 shows a flowchart illustrating a method 1800 that supports network slicing traffic descriptor encoding in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a traffic descriptor including a character string corresponding to a first application identifier of a first application. The operations of 1805 may be performed according to the methods described herein. In some examples, aspects of the operations of 1805 may be performed by a traffic descriptor indicator as described with reference to FIGS. 9 through 12.

At 1810, the base station may transmit the traffic descriptor including the character string that includes a set of bits encoded using ASCII encoding to represent a sequence of characters in the character string. The operations of 1810 may be performed according to the methods described herein. In some examples, aspects of the operations of 1810 may be performed by a traffic descriptor encoder as described with reference to FIGS. 9 through 12.

At 1815, the base station may establish a connection between the UE and a first network slice of a set of available network slices based on the first application identifier. The operations of 1815 may be performed according to the methods described herein. In some examples, aspects of the operations of 1815 may be performed by a network slice connection component as described with reference to FIGS. 9 through 12.

At 1820, the base station may communicate, via the connection with the first network slice, data service traffic of the first application corresponding to the first application identifier. The operations of 1820 may be performed according to the methods described herein. In some examples, aspects of the operations of 1820 may be performed by a network slice communication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of further embodiments of the present invention:

Embodiment 1: A method for wireless communications by a user equipment (UE), comprising receiving a traffic descriptor comprising a character string corresponding to a first application of the UE; identifying a first application identifier of the first application based at least in part on the character string; establishing a connection with a first network slice of a plurality of available network slices based at least in part on the first application identifier; and communinicating, via the connection with the first network slice, data service traffic of the first application corresponding to the first application identifier.

Embodiment 2: The method of embodiment 1, further comprising transmitting, via the connection, a data service request that requests a data service for the first application and comprises the character string, wherein the data service traffic is communicated based at least in part on the data service request.

Embodiment 3: The method of any one of embodiments 1 through 2, wherein establishing the connection with the first network slice comprises: transmitting a registration request comprising the character string that requests to register the first application with the first network slice of the plurality of available network slices, wherein the data service traffic is communicated based at least in part on the registration request.

Embodiment 4: The method of any one of embodiments 1 through 3, further comprising receiving control signaling that indicates a plurality of character strings for a plurality of applications listed in an application table.

Embodiment 5: The method of any one of embodiments 1 through 4, wherein receiving the traffic descriptor comprises: receiving the traffic descriptor comprising the character string that comprises a plurality of bits encoded to represent a sequence of characters in the character string.

Embodiment 6: The method of embodiment 5, further comprising decoding the plurality of bits to obtain the character string.

Embodiment 7: The method of any one of embodiments 1 through 6, wherein receiving the traffic descriptor comprises: receiving the traffic descriptor comprising the character string that comprises a plurality of bits encoded using American Standard Code for Information Interchange (ASCII) encoding to represent a sequence of characters in the character string.

Embodiment 8: The method of any one of embodiments 1 through 7, wherein receiving the traffic descriptor comprises: receiving the traffic descriptor that is a network slice selection policy traffic descriptor.

Embodiment 9: The method of any one of embodiments 1 through 8, wherein receiving the traffic descriptor comprises: receiving the traffic descriptor comprising the character string that is a field having an octet length.

Embodiment 10: The method of any one of embodiments 1 through 9, wherein identifying the first application identifier comprises: indexing an application table to identify the first application identifier based at least in part on the character string.

Embodiment 11: A method for wireless communications by a base station, comprising transmitting, to a user equipment (UE), a traffic descriptor comprising a character string corresponding to a first application identifier of a first application; establishing a connection between the UE and a first network slice of a plurality of available network slices based at least in part on the first application identifier; and communicating, via the connection with the first network slice, data service traffic of the first application corresponding to the first application identifier.

Embodiment 12: The method of embodiment 11, further comprising receiving, via the connection, a data service request that requests a data service for the first application and comprises the character string, wherein the data service traffic is communicated based at least in part on the data service request.

Embodiment 13: The method of any one of embodiments 11 through 12, wherein establishing the connection with the first network slice comprises: receiving a registration request comprising the character string that requests to register the first application with the first network slice of the plurality of available network slices, wherein the data service traffic is communicated based at least in part on the registration request.

Embodiment 14: The method of any one of embodiments 11 through 13, further comprising transmitting control signaling that indicates a plurality of character strings for a plurality of applications listed in an application table.

Embodiment 15: The method of any one of embodiments 11 through 14, wherein transmitting the traffic descriptor comprises: transmitting the traffic descriptor comprising the character string that comprises a plurality of bits encoded to represent a sequence of characters in the character string.

Embodiment 16: The method of embodiment 15, further comprising encoding the plurality of bits to obtain the character string.

Embodiment 17: The method of any one of embodiments 11 through 16, wherein transmitting the traffic descriptor comprises: transmitting the traffic descriptor comprising the character string that comprises a plurality of bits encoded using American Standard Code for Information Interchange (ASCII) encoding to represent a sequence of characters in the character string.

Embodiment 18: The method of any one of embodiments 11 through 17, wherein transmitting the traffic descriptor comprises: transmitting the traffic descriptor that is a network slice selection policy traffic descriptor.

Embodiment 19: The method of any one of embodiments 11 through 18, wherein transmitting the traffic descriptor comprises: transmitting the traffic descriptor comprising the character string that is a field having an octet length.

Embodiment 20: The method of any one of embodiments 11 through 19, wherein the first application identifier is an operating system application identifier.

Embodiment 21: An apparatus for wireless communications by a UE comprising at least one means for performing a method of any one of embodiments 1 through 10.

Embodiment 22: An apparatus for wireless communications by a UE comprising a processor, memory in electronic communication with the processor, and instructions stored in the memory and executable by the processor to cause the apparatus to perform a method of any one of embodiments 1 through 10.

Embodiment 23: A non-transitory computer-readable medium storing code for wireless communications by a UE comprising a processor, memory in electronic communication with the processor, and instructions stored in the memory and executable by the processor to cause the apparatus to perform a method of any one of embodiments 1 through 10.

Embodiment 24: An apparatus for wireless communications by a base station comprising at least one means for performing a method of any one of embodiments 11 through 20.

Embodiment 25: An apparatus for wireless communications by a base station comprising a processor, memory in electronic communication with the processor, and instructions stored in the memory and executable by the processor to cause the apparatus to perform a method of any one of embodiments 11 through 20.

Embodiment 26: A non-transitory computer-readable medium storing code for wireless communications by a base station comprising a processor, memory in electronic communication with the processor, and instructions stored in the memory and executable by the processor to cause the apparatus to perform a method of any one of embodiments 11 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment (UE), comprising:
receiving an indication of a table that includes a plurality of character strings for a plurality of applications;
receiving a traffic descriptor comprising an operating system application identifier that comprises a character string corresponding to a first application of the UE, the character string comprising an application-common portion and an application-specific portion;
identifying a first application identifier of the first application based at least in part on a comparison of the application-common portion and the application-specific portion of the character string with the plurality of character strings in the table;
establishing a connection with a first network slice of a plurality of available network slices based at least in part on the first application identifier identified from the table; and
communicating, via the connection with the first network slice, data service traffic of the first application corresponding to the first application identifier.

2. The method of claim 1, further comprising:
transmitting, via the connection, a data service request that requests a data service for the first application and comprises the character string, wherein the data service traffic is communicated based at least in part on the data service request.

3. The method of claim 1, wherein establishing the connection with the first network slice comprises:
transmitting a registration request comprising the character string that requests to register the first application with the first network slice of the plurality of available network slices, wherein the data service traffic is communicated based at least in part on the registration request.

4. The method of claim 1, wherein receiving the traffic descriptor comprises:
receiving the traffic descriptor comprising the character string that comprises a plurality of bits encoded to represent a sequence of characters in the character string.

5. The method of claim 4, further comprising:
decoding the plurality of bits to obtain the character string.

6. The method of claim 1, wherein receiving the traffic descriptor comprises:
receiving the traffic descriptor comprising the character string that comprises a plurality of bits encoded using American Standard Code for Information Interchange (ASCII) encoding to represent a sequence of characters in the character string.

7. The method of claim 1, wherein receiving the traffic descriptor comprises:
receiving the traffic descriptor that is a network slice selection policy traffic descriptor.

8. The method of claim 1, wherein receiving the traffic descriptor comprises:
receiving the traffic descriptor comprising the character string that is a field having an octet length.

9. An apparatus for wireless communications by a user equipment (UE), comprising:
one or more processors,
memory coupled with the one or more processors; and
instructions stored in the memory and executable by the one or more processors to cause the apparatus to:
receive an indication of a table that indicates a plurality of character strings for a plurality of applications;
receive a traffic descriptor comprising an operating system application identifier that comprises a character string corresponding to a first application of the UE, the character string comprising an application-common portion and an application-specific portion;
identify a first application identifier of the first application based at least in part on a comparison of the application-common portion and the application-specific portion of the character string with the plurality of character strings in the table;

establish a connection with a first network slice of a plurality of available network slices based at least in part on the first application identifier identified from the table; and communicate, via the connection with the first network slice, data service traffic of the first application corresponding to the first application identifier.

10. The apparatus of claim 9, wherein the instructions are further executable by the one or more processors to cause the apparatus to:

transmit, via the connection, a data service request that requests a data service for the first application and comprises the character string, wherein the data service traffic is communicated based at least in part on the data service request.

11. The apparatus of claim 9, wherein the instructions to establish the connection with the first network slice are executable by the one or more processors to cause the apparatus to:

transmit a registration request comprising the character string that requests to register the first application with the first network slice of the plurality of available network slices, wherein the data service traffic is communicated based at least in part on the registration request.

12. The apparatus of claim 9, wherein the instructions to receive the traffic descriptor are executable by the one or more processors to cause the apparatus to:

receive the traffic descriptor comprising the character string that comprises a plurality of bits encoded to represent a sequence of characters in the character string.

13. The apparatus of claim 12, wherein the instructions are further executable by the one or more processors to cause the apparatus to:

decode the plurality of bits to obtain the character string.

14. The apparatus of claim 9, wherein the instructions to receive the traffic descriptor are executable by the one or more processors to cause the apparatus to:

receive the traffic descriptor comprising the character string that comprises a plurality of bits encoded using American Standard Code for Information Interchange (ASCII) encoding to represent a sequence of characters in the character string.

15. The apparatus of claim 9, wherein the instructions to receive the traffic descriptor are executable by the one or more processors to cause the apparatus to:

receive the traffic descriptor that is a network slice selection policy traffic descriptor.

16. The apparatus of claim 9, wherein the instructions to receive the traffic descriptor are executable by the one or more processors to cause the apparatus to:

receive the traffic descriptor comprising the character string that is a field having an octet length.

17. An apparatus for wireless communications by a network device, comprising:

one or more processors, memory coupled with the one or more processors; and instructions stored in the memory and executable by the one or more processors to cause the apparatus to:

transmit an indication of a table that indicates a plurality of character strings for a plurality of applications;

transmit, to a user equipment (UE), a traffic descriptor comprising an operating system application identifier that comprises a character string corresponding to a first application identifier of a first application, the character string comprising an application-common portion and an application-specific portion, wherein the character string and the first application identifier are included in the table;

establish a connection between the UE and a first network slice of a plurality of available network slices based at least in part on the first application identifier included in the table; and communicate, via the connection with the first network slice, data service traffic of the first application corresponding to the first application identifier.

18. The apparatus of claim 17, wherein the instructions are further executable by the one or more processors to cause the apparatus to:

receive, via the connection, a data service request that requests a data service for the first application and comprises the character string, wherein the data service traffic is communicated based at least in part on the data service request.

19. The apparatus of claim 17, wherein the instructions to establish the connection with the first network slice are executable by the one or more processors to cause the apparatus to:

receive a registration request comprising the character string that requests to register the first application with the first network slice of the plurality of available network slices, wherein the data service traffic is communicated based at least in part on the registration request.

20. The apparatus of claim 17, wherein the instructions to transmit the traffic descriptor are executable by the one or more processors to cause the apparatus to:

transmit the traffic descriptor comprising the character string that comprises a plurality of bits encoded to represent a sequence of characters in the character string.

21. The apparatus of claim 20, wherein the instructions are further executable by the one or more processors to cause the apparatus to:

encode the plurality of bits to obtain the character string.

22. The apparatus of claim 17, wherein the instructions to transmit the traffic descriptor are executable by the one or more processors to cause the apparatus to:

transmit the traffic descriptor comprising the character string that comprises a plurality of bits encoded using American Standard Code for Information Interchange (ASCII) encoding to represent a sequence of characters in the character string.

23. The apparatus of claim 17, wherein the instructions to transmit the traffic descriptor are executable by the one or more processors to cause the apparatus to:

transmit the traffic descriptor that is a network slice selection policy traffic descriptor.

24. The apparatus of claim 17, wherein the instructions to transmit the traffic descriptor are executable by the one or more processors to cause the apparatus to:

transmit the traffic descriptor comprising the character string that is a field having an octet length.

25. The apparatus of claim 17, wherein the first application identifier is an operating system application identifier.

* * * * *